(12) United States Patent
Rosenberg

(10) Patent No.: US 10,599,315 B2
(45) Date of Patent: *Mar. 24, 2020

(54) METHODS AND SYSTEMS FOR REAL-TIME CLOSED-LOOP COLLABORATIVE INTELLIGENCE

(71) Applicant: Unanimous A.I., Inc., San Francisco, CA (US)

(72) Inventor: Louis B. Rosenberg, San Luis Obispo, CA (US)

(73) Assignee: Unanimous A.I., Inc., San Francisco, CA (US)

(*) Notice: Subject to any disclaimer, the term of this patent is extended or adjusted under 35 U.S.C. 154(b) by 70 days.

This patent is subject to a terminal disclaimer.

(21) Appl. No.: 15/936,324

(22) Filed: Mar. 26, 2018

(65) Prior Publication Data

US 2018/0217745 A1 Aug. 2, 2018

Related U.S. Application Data

(63) Continuation of application No. 14/668,970, filed on Mar. 25, 2015, now Pat. No. 9,959,028.

(Continued)

(51) Int. Cl.
*G06F 3/0484* (2013.01)
*E21B 47/18* (2012.01)
(Continued)

(52) U.S. Cl.
CPC .......... *G06F 3/04847* (2013.01); *E21B 44/00* (2013.01); *E21B 47/122* (2013.01);
(Continued)

(58) Field of Classification Search
CPC .. G06F 3/04847; G06F 3/04842; E21B 44/00; E21B 47/122; E21B 47/18;
(Continued)

(56) References Cited

U.S. PATENT DOCUMENTS 5,808,908 A 9/1998 Ghahramani
6,064,978 A 5/2000 Gardner
(Continued)

FOREIGN PATENT DOCUMENTS

CA 2414397 8/2003
JP 2010191533 9/2010
(Continued)

OTHER PUBLICATIONS

EP; Extended European Search Report for EP Application No. 15852495.9 mailed from the European Patent Office dated Mar. 21, 2018.

(Continued)

*Primary Examiner* — Tadesse Hailu
(74) *Attorney, Agent, or Firm* — Fitch, Even, Tabin & Flannery LLP

(57) ABSTRACT

Systems and methods are for enabling a group of individuals, each using an individual computing device, to collaboratively answer questions or otherwise express a collaborative will/intent in real-time. The collaboration system comprises a plurality of computing devices, each of the devices being used by an individual user, each of the computing devices enabling its user to contribute to the emerging real-time group-wise intent. A collaboration server is disclosed that communicates remotely to the plurality of individual computing devices. Herein, a variety of inventive methods are disclosed for interfacing users in a real-time synchronized group-wise experience, and for deriving a convergent group intent from the collective user input.

33 Claims, 9 Drawing Sheets

Related U.S. Application Data

(60) Provisional application No. 61/970,885, filed on Mar. 26, 2014.

(51) Int. Cl.

| | | |
|---|---|---|
| *E21B 47/12* | (2012.01) | |
| *E21B 44/00* | (2006.01) | |
| *H04L 29/08* | (2006.01) | |
| *G06Q 50/00* | (2012.01) | |
| *G06Q 10/10* | (2012.01) | |
| *E21B 49/00* | (2006.01) | |
| *G01V 13/00* | (2006.01) | |
| *E21B 47/00* | (2012.01) | |

(52) U.S. Cl.
CPC .......... *E21B 47/18* (2013.01); *G06F 3/04842* (2013.01); *G06Q 10/101* (2013.01); *G06Q 50/01* (2013.01); *H04L 67/10* (2013.01); *H04L 67/12* (2013.01); *E21B 47/00* (2013.01); *E21B 47/12* (2013.01); *E21B 49/00* (2013.01); *E21B 49/003* (2013.01); *G01V 13/00* (2013.01)

(58) Field of Classification Search
CPC ........ E21B 47/00; E21B 49/003; E21B 47/12; G06Q 50/01; H04L 67/12; H04L 67/10; G01V 13/00
See application file for complete search history.

(56) References Cited

U.S. PATENT DOCUMENTS

| | | | |
|---|---|---|---|
| 7,158,112 B2 | 1/2007 | Rosenberg | |
| 7,489,979 B2 | 2/2009 | Rosenberg | |
| 7,542,816 B2 | 6/2009 | Rosenberg | |
| 7,562,117 B2 | 7/2009 | Rosenberg | |
| 7,603,414 B2 | 10/2009 | Rosenberg | |
| 7,917,148 B2 | 3/2011 | Rosenberg | |
| 7,937,285 B2 | 5/2011 | Goldberg | |
| 8,176,101 B2 | 5/2012 | Rosenberg | |
| 8,589,488 B2 | 11/2013 | Huston | |
| 8,745,104 B1 | 6/2014 | Rosenberg | |
| 8,762,435 B1 | 6/2014 | Rosenberg | |
| 2002/0171690 A1 | 11/2002 | Fox | |
| 2003/0065604 A1 | 4/2003 | Gatto | |
| 2003/0079218 A1 | 4/2003 | Goldberg | |
| 2004/0210550 A1 | 10/2004 | Williams | |
| 2005/0168489 A1 | 8/2005 | Ausbeck | |
| 2005/0218601 A1 | 10/2005 | Capellan | |
| 2006/0147890 A1 | 7/2006 | Bradford | |
| 2006/0200401 A1 | 9/2006 | Lisani | |
| 2006/0250357 A1 | 11/2006 | Safai | |
| 2007/0097150 A1 | 5/2007 | Ivashin | |
| 2007/0099162 A1 | 5/2007 | Sekhar | |
| 2007/0121843 A1* | 5/2007 | Atazky | H04L 51/32 379/114.13 |
| 2007/0124503 A1 | 5/2007 | Ramos | |
| 2007/0211050 A1 | 9/2007 | Ohta | |
| 2007/0220100 A1 | 9/2007 | Rosenberg | |
| 2008/0103877 A1 | 5/2008 | Gerken | |
| 2009/0037355 A1 | 2/2009 | Brave | |
| 2009/0063379 A1 | 3/2009 | Kelly | |
| 2009/0063463 A1 | 3/2009 | Turner | |
| 2009/0063991 A1 | 3/2009 | Baron | |
| 2009/0239205 A1 | 9/2009 | Morgia | |
| 2009/0287685 A1 | 11/2009 | Charnock | |
| 2009/0325533 A1 | 12/2009 | Lele | |
| 2010/0169144 A1 | 7/2010 | Estill | |
| 2010/0174579 A1 | 7/2010 | Hughes | |
| 2010/0299616 A1 | 11/2010 | Chen | |
| 2011/0087687 A1 | 4/2011 | Immaneni | |
| 2011/0119048 A1 | 5/2011 | Shaw | |
| 2011/0141027 A1 | 6/2011 | Ghassabian | |
| 2011/0276396 A1* | 11/2011 | Rathod | G06Q 10/00 705/14.49 |
| 2012/0005131 A1 | 1/2012 | Horvitz | |
| 2012/0011006 A1 | 1/2012 | Schultz | |
| 2012/0013489 A1 | 1/2012 | Earl | |
| 2012/0079396 A1 | 3/2012 | Neer | |
| 2012/0109883 A1 | 5/2012 | Iordanov | |
| 2012/0191774 A1 | 7/2012 | Bhaskaran | |
| 2012/0290950 A1 | 11/2012 | Rapaport | |
| 2013/0041720 A1 | 2/2013 | Spires | |
| 2013/0097245 A1 | 4/2013 | Adarraga | |
| 2013/0171594 A1 | 7/2013 | Gorman | |
| 2013/0231595 A1 | 9/2013 | Zoss | |
| 2013/0298690 A1 | 11/2013 | Bond | |
| 2013/0311904 A1 | 11/2013 | Tien | |
| 2013/0339445 A1 | 12/2013 | Perincherry | |
| 2014/0075004 A1* | 3/2014 | Van Dusen | H04L 41/04 709/223 |
| 2014/0108915 A1 | 4/2014 | Lu | |
| 2014/0128162 A1 | 5/2014 | Arafat | |
| 2014/0129946 A1 | 5/2014 | Harris | |
| 2014/0162241 A1 | 6/2014 | Morgia | |
| 2014/0249889 A1 | 9/2014 | Park | |
| 2014/0258970 A1 | 9/2014 | Brown | |
| 2014/0279625 A1 | 9/2014 | Carter | |
| 2014/0337097 A1 | 11/2014 | Farlie | |
| 2014/0358825 A1 | 12/2014 | Phillipps | |
| 2014/0379439 A1 | 12/2014 | Sekhar | |
| 2015/0089399 A1 | 3/2015 | Megill | |
| 2015/0156233 A1 | 6/2015 | Bergo | |
| 2015/0170050 A1 | 6/2015 | Price | |
| 2015/0302308 A1 | 10/2015 | Bartek | |
| 2015/0331601 A1 | 11/2015 | Rosenberg | |
| 2016/0078458 A1 | 3/2016 | Gold | |
| 2016/0366200 A1 | 12/2016 | Healy | |

FOREIGN PATENT DOCUMENTS

| | | |
|---|---|---|
| JP | 5293249 | 9/2013 |
| KR | 101273535 | 6/2013 |
| WO | 2011121275 | 10/2011 |
| WO | 2014023432 | 1/2014 |
| WO | 2014190351 | 11/2014 |

OTHER PUBLICATIONS

PCT; International Search Report and Written Opinion of the International Searching Authority for PCT/US2017/062095 dated May 23, 2018.
Rosenberg: U.S. Appl. No. 15/959,080, filed Apr. 20, 2018.
USPTO; Non-Final Office Action for U.S. Appl. No. 14/925,837 dated Apr. 3, 2018.
"Dialogr—A simple tool for collective thinking"; Mar. 25, 2015; http://www.dialogr.com./; 1 page.
Beni; "From Swarm Intelligence to Swarm Robotics"; Swarm Robotics WS 2004, LNCS 3342; pp. 1-9; 2005.
Cuthbertson; "Artificial Intelligence Turns $20 into $11,000 in Kentucky Derby Bet"; Newsweek Tech & Science; http://www.newsweek.com/artificial-intelligence-turns-20-11000-kentucky-derby-bet-457783; May 10, 2016; 9 pages.
Cuthbertson; "Oscar Predictions: AI Calculates Leonardo DiCaprio Will Finally Get His Oscar"; Newsweek Tech & Science; http://www.newsweek.com/oscar-predictions-artificial-intelligence-predicts-leo-will-finally-get-his-430712; Feb. 26, 2016; 3 pages.
Cuthbertson; "Swarm Intelligence: AI Algorithm Predicts the Future"; Newsweek Tech & Science; http://www.newsweek.com/swarm-intelligence-ai-algorithm-predicts-future-418707; Jan. 25, 2016; 4 pages.
Deck et al; "Prediction Markets in the Laboratory"; University of Arkansas and Chapman University; J. Econ. Surv., 2013; 33 pages.
Deneubourg et al; "Collective Patterns and Decision-Making"; Ethology Ecology & Evolution; Mar. 22, 1989; pp. 295-311.
Ding et al; "Time Weight Collaborative Filtering"; CIKM'05, Oct. 31-Nov. 5, 2005; Bremen, Germany; pp. 485-492.

(56) References Cited

OTHER PUBLICATIONS

EP; Extended European Search Report for EP Application No. 15767909.3 mailed from the European Patent Office dated Sep. 4, 2017.
EP; Extended European Search Report for EP Application No. 15808982.1 mailed from the European Patent Office dated Nov. 28, 2017.
Gauchou et al; "Expression of Nonconscious Knowledge via Ideomotor Actions"; Consciousness and Cognition; Jul. 28, 2011; 9 pages.
Green; "Testing and Quantifying Collective Intelligence"; Collective Intelligence 2015; May 31, 2015; 4 pages.
Hanson et al; "Information Aggregation and Manipulation in an Experimental Market"; Interdisciplinary Center for Economic Science, George Mason University; Jul. 12, 2005; 15 pages.
Herkewitz; "Upvotes, Downvotes, and the Science of the Reddit Hivemind"; Aug. 8, 2013; http://www.popularmechanics.com/science/health/a9335/upvotes-downvotes-and-the-scien . . . ; downloaded Mar. 25, 2015; 10 pages.
International Search Report and Written Opinion of the International Searching Authority for PCT/US2015/022594 dated Jun. 29, 2015.
Malone et al; "Harnessing Crowds: Mapping the Genome of Collective Intelligence"; MIT Center for Collective Intelligence; Feb. 2009; 20 pages.
Meyer; "Meet Loomio, The Small-Scale Decision-Making Platform With the Biggest Ambitions"; Mar. 13, 2014; https://gigaom.com/2014/03/13/meet-loomio-the-small-scale-decision-making-platform-wi . . . ; downloaded Mar. 25, 2015; 11 pages.
PCT; International Search Report and Written Opinion of the International Searching Authority for PCT/US2015/035694 dated Aug. 28, 2015.
PCT; International Search Report and Written Opinion of the International Searching Authority for PCT/US2015/56394 dated Feb. 4, 2016.
PCT; International Search Report and Written Opinion of the International Searching Authority for PCT/US2016/040600 dated Nov. 29, 2016.
PCT; International Search Report and Written Opinion of the International Searching Authority for PCT/US2017/040480 dated Oct. 23, 2017.
Rand et al; "Dynamic Social Networks Promote Cooperation in Experiments with Humans"; PNAS; Nov. 29, 2011; vol. 108, No. 48; pp. 19193-19198.
Robertson; "After Success of Mob-Run 'Pokemon', Twitch Bets on Turning Viewers Into 'Torture Artists' Streaming Game Platform Helps Fund 'Choice Chamber', Where the Chat Window Sets the Challenges"; The Verge; Apr. 16, 2014; http://www.theverge.com/2014/4/16/5618334/twitch-streaming-platform-funds-viewer-con . . . ; downloaded Mar. 25, 2015; 4 pages.
Rosenberg et al; "Amplifying Prediction Accuracy Using Swarm A. I."; Intelligent Systems Conference 2017; Sep. 7, 2017; 5 pages.
Rosenberg et al; "Crowds vs. Swarms, A Comparison of Intelligence"; IEEE; Oct. 21, 2016; 4 pages.
Rosenberg; "Artificial Swarm Intelligence vs. Human Experts"; Neural Networks (IJCNN); 2016 International Joint Conference on IEEE; Jul. 24, 2016; 5 pages.
Rosenberg; "Artificial Swarm Intelligence, a human-in-the-loop approach to A. I."; Association for the Advancement of Artificial Intelligence; Feb. 12, 2016; 2 pages.
Rosenberg; "Human Swarming and the Future of Collective Intelligence"; Singularity WebLog; https://www.singularityweblog.com/human-swarming-and-the-future-of-collective-intelligence/; Jul. 19, 2015; 7 pages.
Rosenberg; "Human Swarming, a real-time method for Parallel Distributed Intelligence"; Proceedings of IEEE, 2015 Swarm/Human Blended Intelligence; Sep. 28, 2015; 7 pages.
Rosenberg; "Human Swarms Amplify Accuracy in Honesty Detection"; Collective Intelligence 2017; Jun. 15, 2017; 5 pages.
Rosenberg; "Human Swarms, A Real-Time Method for Collective Intelligence"; Proceedings of the European Conference on Artificial Life 2015; Jul. 20, 2015; pp. 658-659.
Rosenberg; "Monkey Room Book One"; Outland Pictures; Amazon ebook; Jan. 15, 2014; 39 pages.
Rosenberg; "Monkey Room Book Three"; Outland Pictures; Amazon ebook; Feb. 20, 2014; 22 pages.
Rosenberg; "Monkey Room Book Two"; Outland Pictures; Amazon ebook; Feb. 9, 2014; 27 pages.
Rosenberg; "Monkey Room"; Outland Pictures; Amazon; Mar. 30, 2014; 110 pages.
Rosenberg; "New Hope for Humans in an A. I. World"; TEDxKC—You Tube; Sep. 7, 2017; http://www.youtube.com/watch?v=EuRyZT_Uas.
Rosenberg; U.S. Appl. No. 14/668,970, filed Mar. 25, 2015.
Rosenberg; U.S. Appl. No. 14/708,038, filed May 8, 2015.
Rosenberg; U.S. Appl. No. 14/738,768, filed Jun. 12, 2015.
Rosenberg; U.S. Appl. No. 14/859,035, filed Sep. 18, 2015.
Rosenberg; U.S. Appl. No. 14/920,819, filed Oct. 22, 2015.
Rosenberg; U.S. Appl. No. 14/925,837, filed Oct. 28, 2015.
Rosenberg; U.S. Appl. No. 15/017,424, filed Feb. 5, 2016.
Rosenberg; U.S. Appl. No. 15/047,522, filed Feb. 18, 2016.
Rosenberg; U.S. Appl. No. 15/052,876, filed Feb. 25, 2016.
Rosenberg; U.S. Appl. No. 15/086,034, filed Mar. 30, 2016.
Rosenberg; U.S. Appl. No. 15/199,990, filed Jul. 1, 2016.
Rosenberg; U.S. Appl. No. 15/241,340, filed Aug. 19, 2016.
Rosenberg; U.S. Appl. No. 15/640,145, filed Jun. 30, 2017.
Rosenberg; U.S. Appl. No. 15/898,468, filed Feb. 17, 2018.
Rosenberg; U.S. Appl. No. 15/904,239, filed Feb. 23, 2018.
Rosenberg; U.S. Appl. No. 15/910,934, filed Mar. 2, 2018.
Rosenberg; U.S. Appl. No. 15/922,453, filed Mar. 15, 2018.
Salminen; "Collective Intelligence in Humans: A Literature Review"; Lappeenranta University of Technology, Lahti School of Innovation; 1Proceedings; 2012; 8 pages.
Souppouris; "Playing 'Pokemon' with 78,000 People is Frustratingly Fun"; The Verge; Feb. 17, 2014; http://www.theverge.com/2014/2/17/5418690/play-this-twitch-plays-pokemon-crowdsource . . . ; downloaded Mar. 25, 2015; 3 pages.
Stafford; "How the Ouija Board Really Moves"; BBC Future; Jul. 30, 2013; http://www.bbc.com/future/story/20130729-what-makes-the-ouija-board-move; downloaded Mar. 25, 2015; 5 pages.
Surowiecki; "The Wisdom of Crowds—Why the Many Are Smarter Than the Few and How Collective Wisdom Shapes Business, Economies, Societies, and Nations"; Business Book Review; vol. 21, No. 43; 2006; 10 pages.
Unanimous A. I.; "What is Swarm Intelligence"; 2015; http://unu.ai/swarm-intelligence/; downloaded Oct. 6, 2016; 3 pages.
USPTO; Non-Final Office Action for U.S. Appl. No. 14/738,768 dated Sep. 8, 2017.
USPTO; Non-Final Office Action for U.S. Appl. No. 15/047,522 dated Jan. 5, 2018.
USPTO; Non-Final Office Action for U.S. Appl. No. 14/708,038 dated Feb. 15, 2018.
USPTO; Non-Final Office Action for U.S. Appl. No. 14/859,035 dated Feb. 12, 2018.
USPTO; Non-Final Office Action for U.S. Appl. No. 15/052,876 dated Feb. 22, 2018.
USPTO; Non-Final Office Action for U.S. Appl. No. 15/086,034 dated Feb. 2, 2018.
USPTO; Non-Final Office Action for U.S. Appl. No. 16/668,970 dated Aug. 15, 2017.
USPTO; Notice of Allowance for U.S. Appl. No. 14/668,970 dated Feb. 8, 2018.
USPTO; Notice of Allowance for U.S. Appl. No. 14/738,768 dated Feb. 2, 2018.
Wikipedia; "Swarm (simulation)"; Jul. 22, 2016; http://en.wikipedia.org/wiki/Swarm_(simulation); downloaded Oct. 6, 2016; 2 pages.
Wikipedia; "Swarm intelligence"; Aug. 31, 2016; http://en.wikipedia.org/wiki/Swarm_intelligence; downloaded Oct. 6, 2016; 8 pages.

(56) References Cited

OTHER PUBLICATIONS

Yeung et al.; "Metacognition in human decision-making: confidence and error monitoring"; Philosophical Transactions of the Royal Society B; 2012; pp. 1310-1321.

* cited by examiner

US 10,599,315 B2

METHODS AND SYSTEMS FOR REAL-TIME CLOSED-LOOP COLLABORATIVE INTELLIGENCE

This application is a continuation of U.S. application Ser. No. 14/668,970 entitled METHODS AND SYSTEMS FOR REAL-TIME CLOSED-LOOP COLLABORATIVE INTELLIGENCE, filed Mar. 25, 2015, which in turns claims the benefit of U.S. Provisional Application No. 61/970,885 entitled METHOD AND SYSTEM FOR ENABLING A GROUPWISE COLLABORATIVE CONSCIOUSNESS, filed Mar. 26, 2014, both of which are incorporated in their entirety herein by reference.

BACKGROUND OF THE INVENTION

1. Field of the Invention

The present invention relates generally to systems and methods for group collaboration, and more specifically to systems and methods for closed-loop, dynamic group collaboration.

2. Discussion of the Related Art

Portable computing devices, such as cell phones, personal digital assistants, and portable media players have become popular personal devices due to their highly portable nature, their ability to provide accessibility to a large library of stored media files, their interconnectivity with existing computer networks, and their ability to pass information to other portable computing devices and/or to centralized servers through phone networks, wireless networks and/or through local spontaneous networks such as Bluetooth® networks. Many of these devices also provide the ability to store and display media, such as songs, videos, podcasts, ebooks, maps, and other related content and/or programming. Many of these devices are also used as navigation tools, including GPS functionality. Many of these devices are also used as personal communication devices, enabling phone, text, picture, and video communication with other similar portable devices. Many of these devices include touch screens, tilt interfaces, voice recognition, and other modern user input modes. As a result, the general social trend within industrial societies is that every person does now or soon will maintain at least one such multi-purpose electronic device upon their person at most times, especially when out and about.

While such devices allow accessing information and person to person communication, they do not provide any unique tools and infrastructure that specifically enable groups of electronically networked individuals to have a real-time group-wise experience that evokes the group's collaborative intent and intelligence (Collaborative Consciousness). Hence, there is a substantial need to provide tools and methods by which groups of individuals, each having a portable computing device upon their person, to more easily contribute their personal will/intent to an emerging collaborative consciousness, allowing the group to collectively answer questions or otherwise express their group-wise will in real-time. Furthermore, there is a need to provide tools and methods that enable groups of users to be informed of the group-wise will that is emerging in real-time. The present invention, as described herein, addresses these and other deficiencies present in the art.

SUMMARY OF THE INVENTION

Several embodiments of the invention advantageously address the needs above as well as other needs by providing a real-time collaborative control system comprising: a real-time collaborative control system comprising: a plurality of computing devices each comprising a communications infrastructure coupled to each of a processor, a memory, a timing circuit, a display interface coupled to a display and configured to receive input from a user; a collaborative intent application stored on each memory and configured to run on each processor to: convey to the user, using the display interface, a group collaboration opportunity, receive, repeatedly in real-time, user input of a user intent vector through the display interface, send, repeatedly in real-time, the user intent vector to a collaboration server, receive, repeatedly in real-time, a group intent vector from the collaboration server, and present, repeatedly in real-time, a graphical indication of the group intent vector to the user using the display interface; and the collaboration server in networked communication with the plurality of computing devices, the collaboration server including a processor and a memory, the processor configured to run a collaboration mediation application stored on the memory, the collaboration mediation application configured to: send the group collaboration opportunity to the plurality of computing devices, receive, repeatedly in real-time, the user intent vector from each of the plurality of computing devices, responsively determine, repeatedly in real-time, the group intent vector from the user intent vectors, and send, repeatedly in real-time, the group intent vector to the plurality of computing devices; whereby a closed-loop system is formed between the collaboration server and the plurality of collaborative intent applications.

In another embodiment, the invention can be characterized as a method for a collaborative control process in real-time, comprising the steps of: sending of a group collaboration opportunity, from a collaboration server running a collaboration mediation application, to a plurality of computing devices, each of the computing devices running a collaborative intent application; inputting, repeatedly in real-time, by a user of each of the plurality of computing devices, an indication of a user intent vector in response to the group collaboration opportunity; sending, repeatedly in real-time, to the collaboration server, by each collaborative intent application, of the user intent vector; determining, repeatedly in real-time, by the collaboration server, of a group intent vector based on the user intent vectors; sending, repeatedly in real-time, by the collaboration server, of the group intent vector to the collaborative intent application of each of the plurality of computing devices; and displaying, repeatedly in real-time, by the collaborative intent application, a graphical indication of the group intent vector on a display of the computing device, whereby a closed-loop system is formed between the collaboration server and the plurality of collaborative intent application running on the plurality of computing devices.

In yet another embodiment, the invention may be characterized as a method for determining a real-time group response from a plurality of networked computing devices during a collaborative session, comprising the steps of: sending across a network, by a collaboration server, of a question to the plurality of computing devices; displaying, by a collaborative intent application running of each of the plurality of computing devices, of the question; inputting, repeatedly in real-time, by each of a plurality of users, on a target board of a display of the computing device of each user, of a user intent vector representing a desired direction of motion of a collaboratively controlled pointer, the collaboratively controlled pointer having a first coordinate location on the target board; sending, repeatedly in real-time of, by a collaborative intent application running on each computing device, of the user intent vectors to a collaboration server in communication with the plurality of computing devices; determining, repeatedly in real-time, by the collaboration server of a group intent vector from the plurality of user intent vectors; sending, repeatedly in real-time, by the collaboration server to the plurality of computing devices of a second coordinate location for the collaboratively controlled pointer based on the group intent vector; and updating, repeatedly in real-time, by the collaborative intent application of each computing device, of a displayed location of the collaboratively controlled pointer on the target board based upon the received second coordinate location, whereby the real-time group response to the question is determined.

BRIEF DESCRIPTION OF THE DRAWINGS

The above and other aspects, features and advantages of several embodiments of the present invention will be more apparent from the following more particular description thereof, presented in conjunction with the following drawings.

Figure 1:
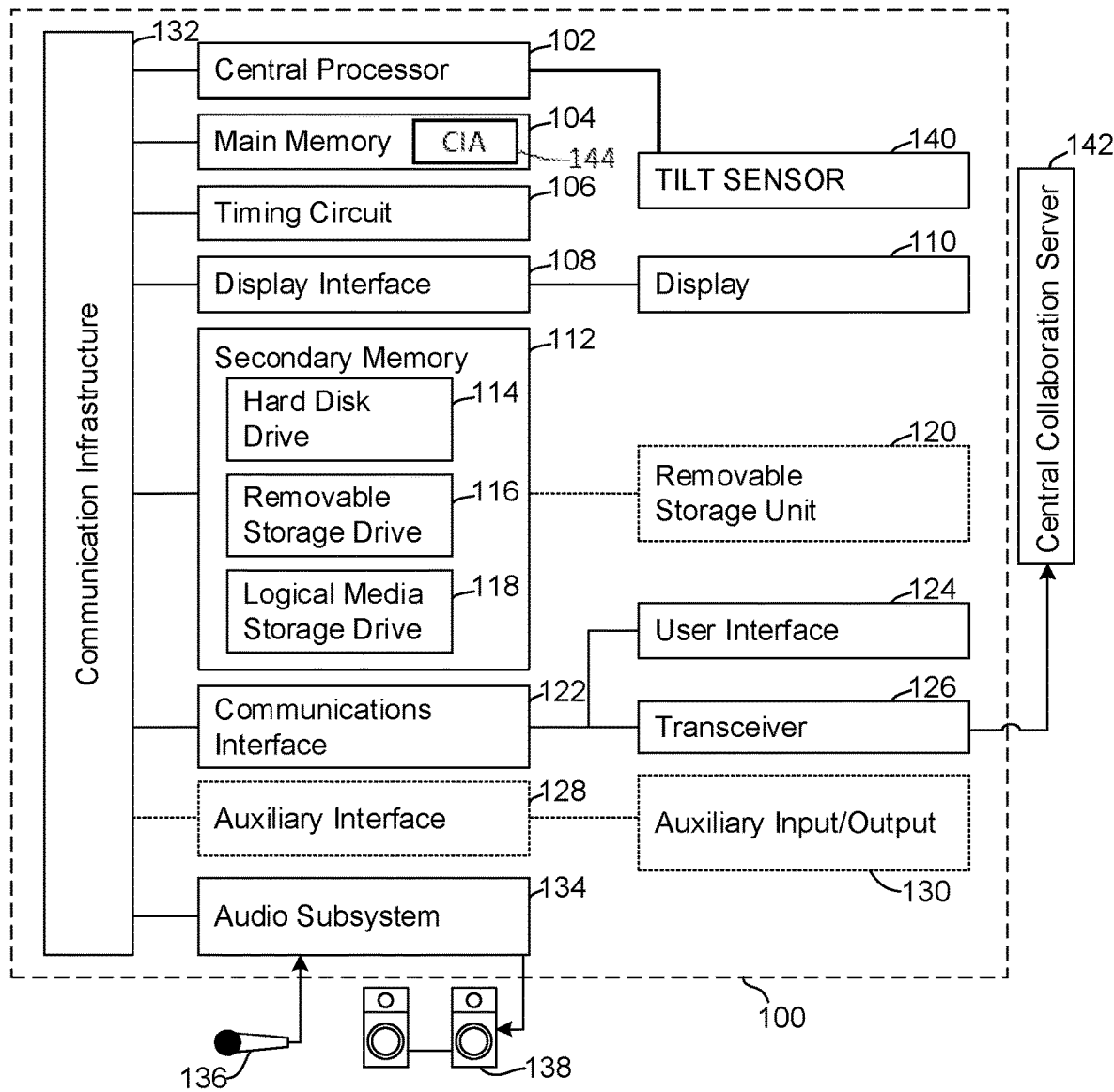
FIG. 1 is a schematic diagram of a portable computing device in accordance with one embodiment of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

As referred to in this specification, "media items" refers to video, audio, streaming and any combination thereof. In addition, the audio subsystem is envisioned to optionally include features such as graphic equalization, volume, balance, fading, base and treble controls, surround sound emulation, and noise reduction. One skilled in the relevant art will appreciate that the above cited list of file formats is not intended to be all inclusive.

As described herein, the massive connectivity provided by the Internet is used to create a real-time closed-loop collaborative consciousness (or emergent group-wise intelligence) by collecting real-time input from large numbers of people through a novel user interface and processing the collected input from that large number of users into a singular intent that can answer questions or otherwise take actions or convey will in real-time. The methods use intervening software and hardware to moderate the process, closing the loop around the disparate input from each of the many individual participants and the singular output of the group. In a preferred embodiment, each individual user ("participant") engages the user interface on a portable computing device, conveying his or her individual real-time will in response to a prompt such as a textually displayed (or audibly displayed) question as well as in response to real-time feedback provided to the user of the group's emerging real-time intent. This closes the loop around each user, for he is conveying individual intent while also reacting to the group's emerging intent. Thus, each user must be able to see not only the prompt that begins a session, but the real-time group intent as it is forming. For example, if the intent is being conveyed as words, the user will see those words form, letter by letter. If the intent is being conveyed as a direction, the user sees the direction form, degree by degree. If the intent is being conveyed as a choice among objects, the user sees a pointer 406 get closer and closer to a particular chosen object. Thus, the user is seeing the group's will emerge before his eyes, reacting to that will in real-time, and thus contributing to it. This closes the loop, not just around one user, but around all users who have a similar experience on their own individual computing device. While the embodiments described generally refer to portable computing devices, it will be understood that non-portable computing devices, such as desktop computers, may also be used.

Real-time occurrences as referenced herein are those that are substantially current within the context of human perception and reaction.

Referring first to FIG. 1, a schematic diagram of a portable computing device 100 in one embodiment of the collaboration system is shown. Shown are a central processor 102, a main memory 104, a timing circuit 106, a display interface 108, a display 110, a secondary memory subsystem 112, a hard disk drive 114, a removable storage drive 116, a logical media storage drive 118, a removable storage unit 120, a communications interface 122, a user interface 124, a transceiver 126, an auxiliary interface 128, an auxiliary I/O port 130, communications infrastructure 132, an audio subsystem 134, a microphone 136, headphones 138, a tilt sensor 140, and a central collaboration server 142.

Each of a plurality of portable computing devices 100, each used by one of a plurality of users (the plurality of users also referred to as a group), is networked in real-time to the central collaboration server (CCS) 142. In some embodiments, one of the portable computing devices 100 could act as the central collaboration server 142. For the purposes of this disclosure, the central collaboration server 142 is its own computer system in a remote location, and not the portable computing device 100 of one of the users. Hence the collaboration system is comprised of the centralized central collaboration server 142 and the plurality of portable computing devices 100, each of the portable computing devices 100 used by one user.

The portable computing device 100 may be embodied as a handheld unit, a pocket housed unit, a body worn unit, or other portable unit that is generally maintained on the person of a user. The portable computing device 100 may be wearable, such as transmissive display glasses.

The central processor 102 is provided to interpret and execute logical instructions stored in the main memory 104. The main memory 104 is the primary general purpose storage area for instructions and data to be processed by the central processor 102. The main memory 104 is used in the broadest sense and may include RAM, EEPROM and ROM. The timing circuit 106 is provided to coordinate activities within the portable computing device 100. The central processor 102, main memory 104 and timing circuit 106 are directly coupled to the communications infrastructure 132. The central processor 102 may be configured to run a variety of applications, including for example phone and address book applications, media storage and play applications, gaming applications, clock and timing applications, phone and email and text messaging and chat and other communication applications. The central processor 102 is also configured to run at least one Collaborative Intent Application (CIA). The Collaborative Intent Application may be a standalone application or may be a component of an application that also runs upon other networked processors.

The portable computing device 100 includes the communications infrastructure 132 used to transfer data, memory addresses where data items are to be found and control signals among the various components and subsystems of the portable computing device 100.

The display interface 108 is provided upon the portable computing device 100 to drive the display 110 associated with the portable computing device 100. The display interface 108 is electrically coupled to the communications infrastructure 132 and provides signals to the display 110 for visually outputting both graphics and alphanumeric characters. The display interface 108 may include a dedicated graphics processor and memory to support the displaying of graphics intensive media. The display 110 may be of any type (e.g., cathode ray tube, gas plasma) but in most circumstances will usually be a solid state device such as liquid crystal display. The display 110 may include a touch screen capability, allowing manual input as well as graphical display.

Affixed to the display 110, directly or indirectly, is the tilt sensor 140 (accelerometer or other effective technology) that detects the physical orientation of the display 110. The tilt sensor 140 is also coupled to the central processor 102 so that input conveyed via the tilt sensor 140 is transferred to the central processor 102. The tilt sensor 140 provides input to the Collaborative Intent Application, as described later. Other input methods may include eye tracking, voice input, and/or manipulandum input.

The secondary memory subsystem 112 is provided which houses retrievable storage units such as the hard disk drive 114 and the removable storage drive 116. Optional storage units such as the logical media storage drive 118 and the removable storage unit 118 may also be included. The removable storage drive 116 may be a replaceable hard drive, optical media storage drive or a solid state flash RAM device. The logical media storage drive 118 may be a flash RAM device, EEPROM encoded with playable media, or optical storage media (CD, DVD). The removable storage unit 118 may be logical, optical or of an electromechanical (hard disk) design.

The communications interface 122 subsystem is provided which allows for standardized electrical connection of peripheral devices to the communications infrastructure 132 including, serial, parallel, USB, and Firewire connectivity. For example, the user interface 124 and the transceiver 126 are electrically coupled to the communications infrastructure 132 via the communications interface 122. For purposes of this disclosure, the term user interface 124 includes the hardware and operating software by which the user executes procedures on the portable computing device 100 and the means by which the portable computing device 100 conveys information to the user. In the present invention, the user interface 124 is controlled by the CIA and is configured to display information regarding the group collaboration, as well as receive user input and display group output. The CIA is described in more detail below in FIG. 3.

To accommodate non-standardized communications interfaces (i.e., proprietary), the optional separate auxiliary interface 128 and the auxiliary I/O port 130 are provided to couple proprietary peripheral devices to the communications infrastructure 132. The transceiver 126 facilitates the remote exchange of data and synchronizing signals between the portable computing device 100 and the Central Collaboration Server 142. The transceiver 126 could also be used to enable communication among a plurality of portable computing devices 100 used by other participants. In some embodiments, one of the portable computing devices 100 acts as the Central Collaboration Server 142, although the ideal embodiment uses a dedicated server for this purpose. In one embodiment the transceiver 126 is a radio frequency type normally associated with computer networks for example, wireless computer networks based on BlueTooth® or the various IEEE standards 802.11.sub.x., where x denotes the various present and evolving wireless computing standards. In some embodiments the portable computing devices 100 establish an ad hock network between and among them, as with a BlueTooth® communication technology.

It should be noted that any prevailing wireless communication standard may be employed to enable the plurality of portable computing devices 100 to exchange data and thereby engage in a collaborative consciousness process. For example, digital cellular communications formats compatible with for example GSM, 3G, 4G, and evolving cellular communications standards. Both peer-to-peer (PPP) and client-server models are envisioned for implementation of the invention. In a third alternative embodiment, the transceiver 126 may include hybrids of computer communications standards, cellular standards and evolving satellite radio standards.

The audio subsystem 134 is provided and electrically coupled to the communications infrastructure 132. The audio subsystem 134 is configured for the playback and recording of digital media, for example, multi or multimedia encoded in any of the exemplary formats MP3, AVI, WAV, MPG, QT, WMA, AIFF, AU, RAM, RA, MOV, MIDI, etc.

The audio subsystem 134 in one embodiment includes the microphone 136 which is used for the detection and capture of vocal utterances from that unit's user. In this way the user may issue a suggestion as a verbal utterance. The portable computing device 100 may then capture the verbal utterance, digitize the utterance, and convey the utterance to other of said plurality of users by sending it to their respective portable computing devices 100 over the intervening network. In this way, the user may convey a suggestion verbally and have the suggestion conveyed as verbal audio content to other users. It should be noted that if the users are in close physical proximity the suggestion may be conveyed verbally without the need for conveying it through an electronic media. The user may simply speak the suggestion to the other members of the group who are in close listening range. Those users may then accept or reject the suggestion using their portable electronic devices 100 and taking advantage of the tallying, processing, and electronic decision determination and communication processes disclosed herein. In this way the present invention may act as a supportive supplement that is seamlessly integrated into a direct face to face conversation held among a group of users.

For embodiments that do include the microphone 136, it may be incorporated within the casing of the portable computing device 100 or may be remotely located elsewhere upon a body of the user and is connected to the portable computing device 100 by a wired or wireless link. Sound signals from microphone 136 are generally captured as analog audio signals and converted to digital form by an analog to digital converter or other similar component and/or process. A digital signal is thereby provided to the processor 102 of the portable computing device 100, the digital signal representing the audio content captured by microphone 136. In some embodiments the microphone 136 is local to the headphones 138 or other head-worn component of the user. In some embodiments the microphone 136 is interfaced to the portable computing device 100 by a Bluetooth® link. In some embodiments the microphone 136 comprises a plurality of microphone elements. This can allow users to talk to each other, while engaging in a collaborative experience, making it more fun and social. Allowing users to talk to each other could also be distracting and could be not allowed.

The audio subsystem 134 generally also includes headphones 138 (or other similar personalized audio presentation units that display audio content to the ears of a user). The headphones 138 may be connected by wired or wireless connections. In some embodiments the headphones 138 are interfaced to the portable computing device 100 by the Bluetooth® communication link.

The portable computing device 100 includes an operating system, the necessary hardware and software drivers necessary to fully utilize the devices coupled to the communications infrastructure 132, media playback and recording applications and at least one Collaborative Intent Application operatively loaded into main memory 104, which is designed to display information to a user, collect input from that user, and communicate in real-time with the Central Collaboration Server 142. Optionally, the portable computing device 100 is envisioned to include at least one remote authentication application, one or more cryptography applications capable of performing symmetric and asymmetric cryptographic functions, and secure messaging software. Optionally, the portable computing device 100 may be disposed in a portable form factor to be carried by a user.

Figure 2:
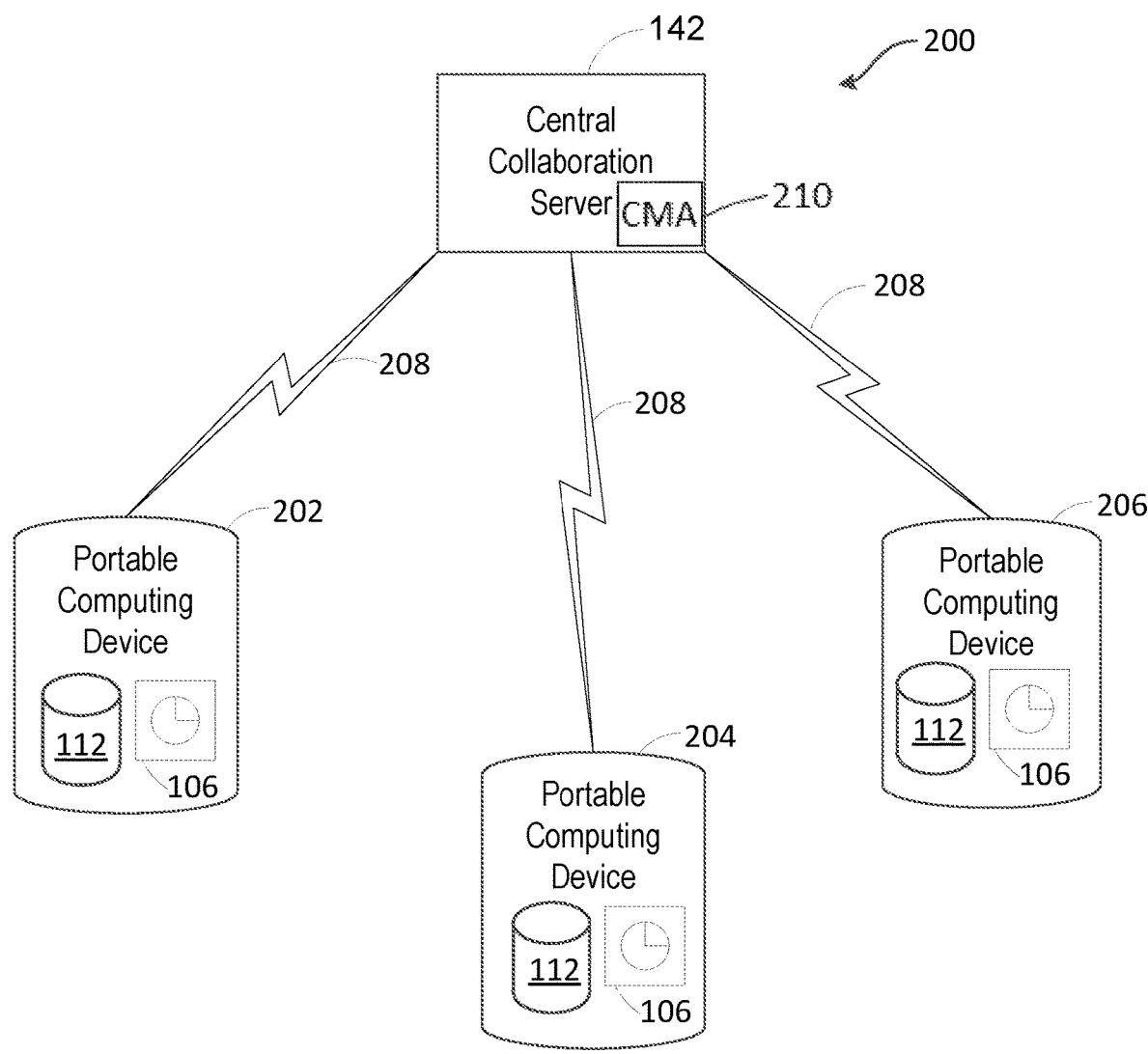
FIG. 2 is a schematic diagram of the collaborative system in accordance with another embodiment of the present invention.

Referring next to FIG. 2, a collaboration system 200 is shown in one embodiment of the present invention. Shown are the central collaboration server 142, a plurality of the secondary memory subsystems 112, a plurality of the timing circuits 106, a first portable computing device 202, a second portable computing device 204, a third portable computing device 206, and a plurality of exchanges of data 208.

The group of users (participants), each using one of the plurality of portable computing devices 100, each portable computing device 100 running the Collaborative Intent Application, each device 100 in communication with the Central Collaboration Server 142, may engage in the collaborative experience that evokes a collective intelligence (also referred to as Collective Consciousness).

As shown in FIG. 2, the CCS 142 is in communication with the plurality of portable computing devices 202, 204, 206. Each of these devices 202, 204, 206 is running the Collaborative Intent Application (CIA). In one example, each of the devices 202, 204, 206 is an iPad® running the CIA, each iPad® communicating with the CCS 142 which is running a Collaboration Mediation application (CMA). Thus, we have the local CIA on each of the plurality of devices 202, 204, 206, each device 202, 204, 206 in real-time communication with the CMA running on the CCS 142. While only three portable devices 202, 204, 206 are shown in FIG. 2 for clarity, in ideal embodiments, dozens, hundreds, thousands, or even millions of devices 100 would be employed in the collaboration system 200. Hence the CCS 142 must be in real-time communication with many devices 100 at once.

The communication between the CCS 142 and each of the devices 202, 204, 206 includes the exchanges of data 208. The data has a very significant real-time function, closing the loop around each user, over the intervening electronic network.

As described above, the present invention allows the group of users, each using their own tablet or phone or other similar portable computing device 100, to collaboratively answer questions in real-time with the support of the mediating system of the CCS 142 which communicates with the local CIA running on each device 100. The Collaborative Intent Application ties each device 100 to the overall collaborative system 200. Multiple embodiments of the CIA are disclosed herein. The Collaborative Intent Application (CIA) may be architected in a variety of ways to enable the plurality of portable computing devices 100 to engage in the collaborative processes described herein, with the supportive use of the Central Collaboration Server 142.

In some embodiments the exchange of data 208 may exist between portable computing devices 100.

Figure 3:
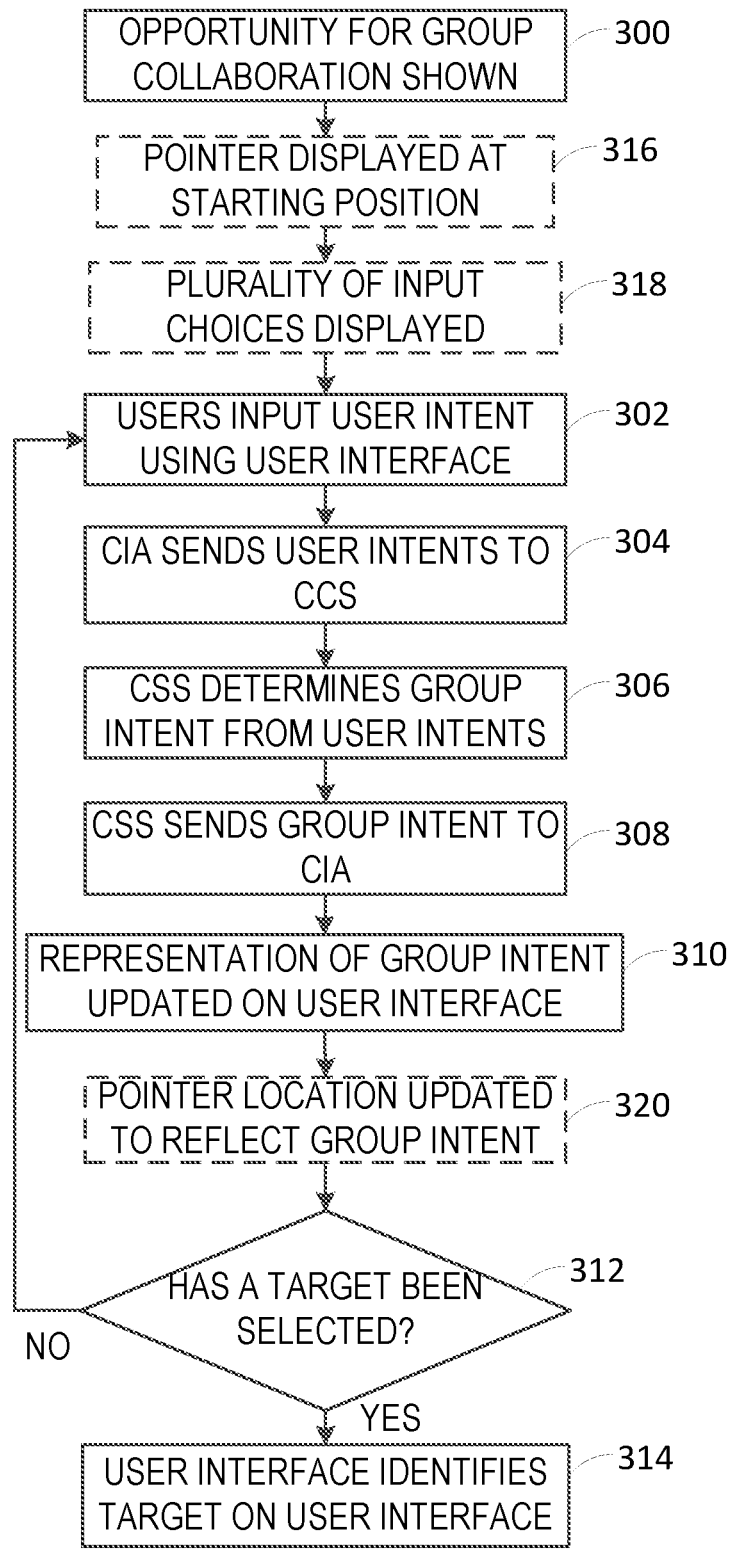
FIG. 3 is a flowchart diagram of a group collaboration process in accordance with another embodiment of the invention.

Referring next to FIG. 3, a flowchart of one embodiment of a group collaboration process is shown. Shown are a collaboration opportunity step 300, a user input step 302, a send user intents to CCS step 304, a determine group intent step 306, a send group intent to CIA step 308, a display intents step 310, a target selection decision point 312, and a display target step 314. The process also includes optional steps that could be included, for example, for the pointer graphical embodiment shown in FIG. 4: a display pointer start position step 316, a display input choices step 318, and an update pointer location step 320. In the collaboration opportunity step 300, the CIA receives the group collaboration opportunity from the CCS 142 and displays the opportunity on the display 110 of the portable computing device 100 (PCD). The group collaboration opportunity may be a question to be answered, for example, "What film will win the Best Picture in the Academy Awards?" or "Who will win the Super Bowl?" The process then proceeds to the user input step 302. The user input step 302 includes the user using the display 110 of the PCD 100 to input the user intent. The user intent is an input interpreted by the user interface 124 as a desired vector direction conveying an intent of the user. In some embodiments, e.g. FIG. 4, the user intent is a desired vector direction of the graphical pointer 406 of the user interface 124, and the user input includes swiping of the pointer 406 via the touchscreen interface, as described further below in FIG. 4. The user input step 302 takes place for each user of the group. The process then proceeds to the send user intent to CCS step 304.

In the send user intent to CCS step 304, the CIA for each PCD 100 sends the user intent to the CCS 142. In the next step, the determine group intent step 306, the CCS 142 determines a collective group intent based on the plurality of user intents. The group intent may be determined through various methods, as described further below. The process then proceeds to the send group intent to CIA step 308.

In the embodiment including the optional steps display pointer start position 316 and the display input choices step 318, in the display pointer start position step 316 the graphical user interface 124 would display the starting, or neutral, position of a pointer 406 chosen to indicate the graphical representation of the group intent. In the following step, the display input choices step 318, the user interface 124 would display a plurality of input choices 412 available to be selected by the group intent by using the pointer 406. The user intent in this embodiment is an input interpreted by the user interface 124 as representing that user's desired motion of the collaborative graphical pointer 406 with respect to the plurality of input choices 412.

In the send group intent to CIA step 308, the CIA receives the group intent from the CCS 142. Next, in the display intents step 310, for each PCD 100 the received representation of the group intent is displayed, along with a representation of the user intent originally input by the user of the PCD 100. The process then proceeds to the target selection decision point 312.

The update pointer location step 320 may be inserted between the display intents step 310 and the target selection decision point 312. In the update pointer location step 320, in the embodiments including the pointer 410 the user interface 124 updates to indicate the current location of the pointer 406 in response to the received group intent.

In the target selection decision point 312, if the group intent received corresponds to selection of the target (in some embodiments, from among the input choices 412), the process proceeds to the display target step 314, and the selected target is displayed on the display 124. If the group intent has not selected the target, the process returns to the user input step 302, and the process repeats until the target is determined by the group intent or until the process is otherwise ended (for example, by a time limit).

After the target has been chosen by the group intent, the entire process may repeat, for example, to form a word if each consecutive target is an alphabetic character.

Referring again to FIGS. 1, 2 and 3, the present invention in one embodiment employs the CCS 142 that users connect to via their portable computing device 100. In some embodiments, fixed or non-portable computing devices 100 can be used as well. In many embodiments, users choose or are assigned a username when they log into the CCS 142, thus allowing software on the CCS 142 to keep track of individual users and assign each one a score based on their prior sessions. This also allows the CCS 142 to employ user scores when computing the average of the group intent of all the users (in embodiments that use the average).

In general, when the session is in progress, the question 400 (as shown below in FIG. 4) is sent from the CCS 142 to each of the CIA on the portable computing devices 100 of the users. In response to the question 400, the users convey their own intent either by manipulating an inner puck 410 of the pointer 406, as described further below, or by using a tilt or swipe input or other user interface methods as described further below. In these examples, the user's intent is conveyed as a direction and a magnitude (a vector) that the user wants the pointer 406 to move. This is a user intent vector and is conveyed to the CCS 142. In some embodiments, the magnitude of the user intent vector is constant. The CCS 142 in some embodiments computes the numerical average (either a simple average or a weighted average) of the group intent for the current time step. Using the numerical average, the CCS 142 updates for the current time step the graphical location of the pointer within a target board 404 displayed on the display 110. This is conveyed as an updated coordinate location sent from the CCS 142 to each of the CIA of participating users on their own devices 100. This updated location appears to each of the users on their individual devices 100. Thus, they see the moving pointer 406, ideally heading towards an input choice 412 on the target board 404. The CCS 142 determines if and when the input choice 412 is successfully engaged by the pointer 406 and if so, that target is selected as an answer, or as a part of the answer (a single letter or space or punctuation mark, for example, that's added to an emerging answer). That target is then added to the emerging answer, which is sent to all the devices 100 and appears on each display 110.

In some embodiments one of the input choices 412 is an "END" or "DONE" input choice, by which the group could choose to call the answer complete. In some embodiments, a PERIOD punctuation mark is an input choice. In yet another embodiment a time limit is included, after which the session is done, the answer complete. At this point, the process repeats with a new question being asked.

The CCS 142 may also be configured to compute scores for each user and transmit those scores to each device 100. Or, the score could be determined locally by the CIA of each device 100 and be transmitted to the CCS 142 for storage. Either way, the score can be computed based on the user's user intent vector during the session and how well it matched up with the group intent vector from the group as a whole (also called an average intent vector). The user who had a user intent vector that was substantially aligned during the time period of the response with the group intent vector is awarded points for the session, while a user who had a user intent vector that was substantially misaligned (for example, more than 180 degrees out of phase in direction), is awarded fewer points or loses points.

Figure 4:
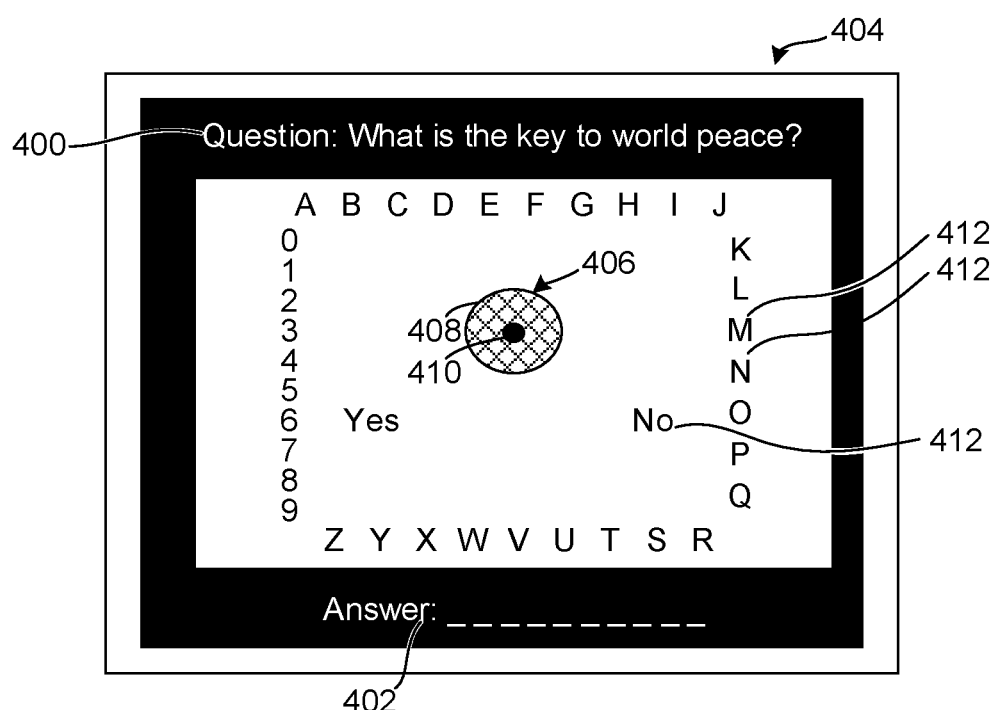
FIG. 4 is a user interface display in accordance with an embodiment of the present invention.

Referring next to FIG. 4, an embodiment of the user interface 124 of the CIA is shown in one embodiment of the present invention. Shown are the question 400, a group answer 402, the target board 404, the pointer 406, an outer puck 408, the inner puck 410, and the plurality of input choices 412.

In the embodiment of FIG. 4, the user interface 124 is modeled upon a traditional manual spirit board. When using the manual spirit board, a group of participants sits around a table, their fingers all touching a physical puck. One participant asks a question and then the puck moves around and picks out letters, eventually giving an answer. Nobody feels like they consciously moved the puck and yet it may produce a meaningful answer. Scientists have shown that spirit boards work because of involuntary motions in the hands of each participant. The participants are making the puck move, and yet each of them will swear that they didn't do anything. This makes it a model for this distributed collaborative interface, although the inventive system herein must employ a variety of clever techniques because the networked computer users will not be touching the same physical puck.

The embodiment shown in FIG. 4 uses the pointer 406 configured as a "puck within a puck". The outer puck 408 is controlled by the group intent and the inner puck 410 is controlled with respect to the outer puck 408 by each local user. In this way, each local user conveys his or her user intent on the inner puck 410, while watching the representation of the group intent as it's reflected in the motion of the outer puck 408, as described further below.

In another embodiment, a single puck is used, but the interface 124 allows each individual to swipe at the puck, imparting intent through the magnitude (i.e. the speed) and the direction of the swipe. In this way, each user watches the puck move under the collective will of the group, while individually swiping at the puck, again and again, trying to influence its motion.

In yet another embodiment, the 124 is a tilt interface, where each user conveys his intent by tilting the display 110 of the portable computing device 100 he or she is using. The user wants the puck to move left, he or she tilts the display 110 left. Of course, the puck is not responsive to the individual user but the group of users, its motion based on the group intent. In this way, the loop is closed around the individual users as they share a collective experience.

Referring again to FIG. 4, the embodiment shown will be described in more detail. As displayed on the display 110 of each user's portable computing device 100, the CIA displays three key pieces of information to each user—(1) it displays the current question 400 that is being posed to the group , (2) it displays the target board 404 of letters and numbers and words (input choices 412) that the users will collectively work to select among, and (3) it displays the pointer 406 that each user watches on their own device 100, and tries to influence, but which moves around the target board 404 based on the collective group intent. Those skilled in the art will note that the display interface 108 shown is one configuration based on a spirit board, and the user interface 124 could have many different visual configurations.

FIG. 4 represents the display 110 that is presented substantially simultaneously on portable computing devices 100 of all the networked users who are participating in real-time collaboration. In this example, let's assume that 100 people are using the system at once. At the start of a session, the question 400 appears appear at a top of the display 110, thus prompting the group of users that an answer is needed. This question 400 could also be conveyed through audio. At the start of the session, the answer 402 at the bottom would be blank, for it would not yet have been formulated by the group intent. In this exemplary display 110, the target board 404 includes input choices 412 of letters A-Z, numerals 0-9 and the words "YES" and "NO". The target board 404 may include other input choices 412, for example additional words or punctuation. In the embodiment shown in FIG. 4, the display 110 also includes the pointer 406, which is displayed as the outer puck 408 with the inner puck 410 at the pointer core, i.e. a "puck-within-a-puck" configuration. This is the graphical pointer 406 that will be moved around by the group under their collective control, to select letters, numbers, and/or words from the available input choices 412.

Figure 5:
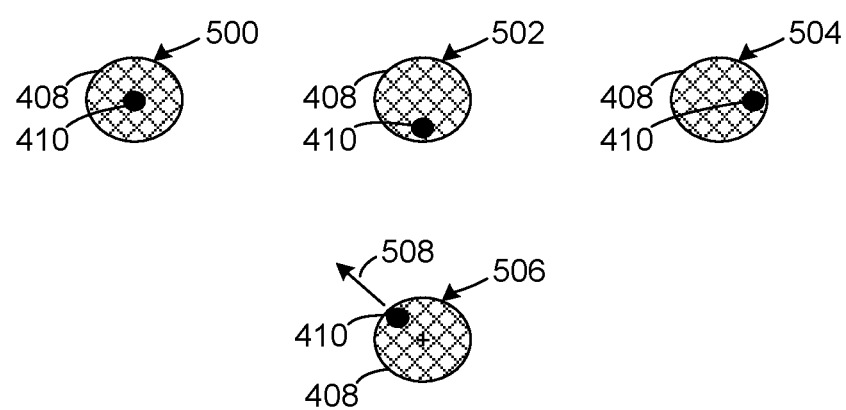
FIG. 5 is a diagram of various embodiments of pointer input in accordance the present invention.

Referring next to FIG. 5, a graphical representation of the puck-within-a-puck control algorithm is shown. Shown are the plurality of inner pucks 410, the plurality of outer pucks 408, a "no input" pointer configuration 500, a downward input pointer configuration 502, a rightward input pointer configuration 504, a general case pointer configuration 506, and a vector 508.

Each user is providing input by manipulating the inner puck 410 at the center of the pointer 406. In one embodiment, the user provides input by touching the inner puck 410 using a finger on a touchscreen. If the user is using a mouse or joystick or other device, the user could position a cursor on the inner puck 410. The key is that each user will input their individual user intent by manipulating the inner puck 410 portion of the pointer 406 with respect to the outer puck 408 of the pointer 406.

A general key to extracting the collective group intent from the group is the method by which the pointer 406 is moved around each individual display 110, using input from the large number of users. One goal may be for the pointer 406 to move based on the numerical average (or weighted average) of the plurality of user intents so it's a real-time collaborative effort. This is critical, but creates challenges to overcome. If the individual user puts his finger on the pointer 406 (using his own touchscreen display 110) and moves his hand the way a typical user interface would work, his finger/pointer location would diverge from what other users are seeing on their display 110s. This would ruin a collaborative experience, for every user would see their own version of the pointer 406 moving based on their own finger location. That's not a synchronized collaborative experience. The pointer 406 has to move based on the group intent, not the input of any individual user. But this creates the alternate problem—if the pointer 406 moved based on the numerical average (or other summation) of the plurality of user intents, each individual user would see the pointer 406 on his display 110 move away from his own finger location, like he had no influence over it at all.

In the pointer control embodiment shown in FIG. 5, the user is advantageously able to see the group intent as it's reflected in the pointer location, and also have a means of viewing his own individual user intent. This is solved in the embodiment of FIG. 5 by employing the puck-within-a-puck pointer 406. In the example shown, the inner puck 410 and the outer puck 408 are each circles, with an outer puck circle surrounding an inner puck circle. Other graphical representations could be devised.

The inner puck 410 is what the individual user will manually manipulate, on his personal computing device 100. The outer puck 408 is controlled by the group as a whole, based in one embodiment on the weighted average of the plurality of user intents. Each user is given two instructions by the CIA. First, they are told they must keep the inner puck 410 inside the outer puck 408, even when the outer puck 408 is moving based on changing group intent. Second, the user is to try to move the outer puck 408 towards the input choice 412 that they believe will best answer the question 400 that was posed. But, the only way the user can influence the outer puck 408 is using the inner puck 410. Some examples of user intent are shown in FIG. 5.

"No input" pointer configuration 500 shows a relative location of the user-controlled inner puck 410 and group-controlled outer puck 408 corresponding to the user not imparting any desired motion on the pointer 406. This means that the user is not imparting any input to help guide the outer puck 408. In the downward input pointer configuration 502, the inner puck 410 has been moved by the user to near a bottom edge of the outer puck 408. Thus, the downward input pointer configuration 502 show a relative location of the user-controlled inner puck 410 and the group-controlled outer puck 410 corresponding to the user imparting a downward desired motion on the pointer 406 (i.e. a downward user intent). In the rightward input pointer configuration 504, the inner puck 410 has been moved by the used near to a right edge of the outer puck 408. Thus, the rightward input pointer configuration 504 shows a relative location of the user-controlled inner puck 410 and group-controlled outer puck 408 corresponding to the user imparting a rightward desired motion on the pointer 406 (i.e. a rightward user intent). In the general case pointer configuration 506, the inner puck 410 is moved by the user towards an edge of the outer puck 408, defining the vector 508 from the center of the outer puck 408 to the center of the inner puck 410. The general case pointer configuration 506 shows a relative location of the user-controlled inner puck 410 and the group-controlled outer puck 408 corresponding to the user imparting a generalized desired motion on the puck in vector 508 (i.e. a generalized vector direction user intent). The vector 508 corresponds to the user intent vector and includes the direction the user wants the outer puck 408 to move.

In some embodiments, the magnitude of the vector 508 (the user intent vector) is constant, only the direction changing with the user's motion of the inner puck 410 relative to the outer puck 408. In other embodiments, the magnitude of the vector 508 varies based on how close the inner puck 410 is to the edge of the outer puck 408. The closer to the edge of the outer puck 408 the inner puck 410 has been moved, the stronger the magnitude of the vector 508.

In this way, each user inputs the user intent vector comprising the magnitude and the direction for which he wants the outer puck 408 to move within the target field. In one embodiment the outer puck 408 moves based on the weighted average of the plurality of user input vectors. Each user sees the outer puck 408 drawn on their display 110 at a location based on the combined group intent based on the input vectors from all the users, the location being updated in real-time (based on data received from the CCS 142). This means each individual user is imparting will by controlling the inner puck 410 on their display 110 in relation to the outer puck 408 that is being controlled by the group as a whole (as determined via from the CCS 142). This allows the user to feel like he is directly influencing something on the local device display 110, while also interacting with something controlled by the group at large. Together, the group will direct the outer puck 408 to target input choices 412, to collaboratively answer the question 400 posed.

Although the example embodiment provides the outer puck 408 controlled by the group intent and the inner puck 410 controlled by each individual user, this configuration can be inverted such that an inner graphical element (analogous to the inner puck 410) is controlled by the group intent and the users control the motion of an outer graphical element (analogous to the outer puck 408) with respect to the inner graphical element.

As described herein, the user intent vector is updated in real-time. As each user conveys intent on the user interface 124, the user intent vector is computed by the local CIA. This user intent vector is communicated to the CCS 142 as data. The data may include the direction that the user desires the puck to move, and the magnitude of desire. This user intent vector is received by the CCS 142, along with user intent vectors from each of the plurality of users. The CCS 142 then computes, in one embodiment, the average vector (or weighted average, or other summation of input) to derive the group intent vector. This group intent vector represents the collective will that the group imparts on the pointer 406 at a current moment in time. The group intent vector is then used to update the coordinate location of the outer puck 408. The updated coordinate is then sent to each of the plurality of devices 100. Each of the users then sees the outer puck 408 move on their display 110, based on the collective group intent. Each user then modifies his input (closing the loop), thus conveying a new user intent vector to the CCS 142, and the process repeats. This happens until the pointer 406 selects one of the input choices 412 as the target, which is then added to the group answer 402, as previously described in FIG. 3. In this way, the group of distributed users, each on their own portable computing device 100, collaborates in real-time to answer questions, and thus evoke the collaborative consciousness.

In one example of implementation of the system, 100 users using 100 portable computing devices 100 are waiting for the session to start. The question 400 then appears on each of their display 110s, sent to them by the Central Collaboration Server 142: "Who will win the NCAA Tournament?" This question could have been proposed by one of the 100 users, a right awarded to that user by the CCS 142 as a consequence of his or her participation. Questions could be queued on the CCS 142, input from many users, and sent out in an order determined by the CCS 142 to the plurality of portable computing devices 100. In some embodiments, the user who earns enough points as a result of accurate participation (participation that is in-sync with the group as a whole), is awarded the right to ask a question.

Regardless of the method by which the question 400 was generated, it is selected by the CCS 142 and sent at a substantially simultaneous moment to the 100 portable computing devices 100 of the 100 users, the question 400 appearing as text on the display 110s of the 100 portable computing devices 100. Also displayed on the display 110 of each of the 100 users is the target board 404 with a field of input choices 412 (which may be answers or elements of answers). The field of input choices 412 could be text and letters, as shown in FIG. 4, or the input choices 412 could be words—the names of all the NFL teams, the names of the months, the colors of the spectrum, etc. Regardless of the specific field of input choices 412, each user imparts his intent by moving the inner puck 410 relative to the outer puck 408. The outer puck 408 starts to move based on the numerical average, or weighted average, of the group intent. In this way a first letter of the answer 402 is targeted—"S". Once this letter is targeted, it appears at the bottom of the display 110 (or in an otherwise designated area), as part of the emerging answer 402. The emerging answer 402 is now "S". The pointer 406 is then re-set to the center of the display 110 for all users, as triggered by data sent from the CCS 142. Because the CCS 142 is sending the display location of the pointer 406 to all the portable computing devices 100, this reset can be achieved at least in part by the CCS 142 sending coordinates for a home position (center of display 110, for example), of the pointer 406, to all the portable computing devices 100.

The users then repeat the process, imparting their individual user intent on the inner puck 410 with respect to the outer puck 408, thereby sending the user intent vectors to the CCS 142, which computes the average (natural or weighted) and generates another group intent vector, using it to update the location of the outer puck 408. The process repeats until the outer puck 408 targets another element of the answer 402, in this example "T". The letter T is added to the emerging answer 402 "ST" at the bottom of the display 110s of all the users. The process repeats, letters being collectively selected, one after another, until the full answer 402 to the question 400 is achieved—"STANFORD". And thus, the group has collectively answered the question 400 through a real-time closed loop synchronized emergent process. This answer 402 is not a poll. It is not a survey. It is the real-time collaboration, the loop being closed around input and output.

It is advantageous to the system to ensure that the inner puck 410 of each individual user stays within the outer puck 408 being moved based on collective input. In one embodiment, the inner puck 410 is not allowed leave the outer puck 408. The inner puck 410 butts up against an edge instead and is prevented from exiting. In some cases this will mean the inner puck 410 is dragged along by the moving outer puck 408. In another embodiment, the user receives a penalty if he allows the inner puck 410 to exit the outer puck 408, losing points in the score he is generating for the session. The score can be like a game, users trying have the highest score possible. This means each individual user is trying to keep the inner puck 410, which is under his individual control on his display 110, inside the outer puck 408 that is moving according to the group intent, based on coordinates received from the CCS 142. At the same time, individual users are trying to influence the outer puck 408 based on the where inside the outer puck 408 he positions the inner puck 410—whichever edge of the outer puck 408 the inner puck 410 is positioned on will convey the user intent vector from that user as described previously. The user can get a score based on (a) how well he keeps his inner puck 410 inside the outer puck 408 (prevents it from leaving), and/or (b) how well that user's user intent vectors were aligned with the group intent vector during the session. This means the system can be configured to award each user points based on how well he keeps the inner puck 410 from leaving the outer puck 408 while trying to guide the outer puck 408 towards targets that form a coherent answer. To incentivize guiding the outer puck 408, not just staying within it, users can be given a cumulative score that is posted on his display 110 (and optionally shared with all users) based on how skillfully he guided the outer puck 408 in the direction of the group intent vector. This score can also be used for weighting user's inputs and/or for granting users the ability to ask questions. Points can be computed in a variety of ways depending on the input method used to control the pointer 406.

To incentivize users to keep the inner puck 410 inside the outer puck 408, but also try to move the outer puck 408 towards desired targets, the points system can be implemented such that users earn points if they are imparting the user intent vector (direction and magnitude) on the outer puck 408 that's heading in the direction that the outer puck 408 is currently moving based on the group intent. In other words, when the individual user inputs the user intent vector that contributes constructively with the group intent, they earn points. Conversely, if the user tries to move the outer puck 408 in a way that opposes the group intent, applying the user intent vector that is not substantially in the current direction of motion of the outer puck 408 (i.e. contributing destructively), the user loses points. Thus, points are awarded for the user "in sync" with the group intent, and points are lost for the user "out of sync" with the group intent. This means each individual user can convey his individual will/intent, but he is also incentivized to help make sure the pointer 406 moves across the display 110 and targets meaningful letters, numbers, and/or words.

Thus, if the individual user's input during the session was constructive (i.e., his input helped guide the pointer 406 towards the targets that made up the answer 402), that user earns points. But, if the individual user's input contribution during the session was destructive (i.e., the input opposed the motions of the pointer 406 as it selected targets and made up the answer 402), then that user loses points. A skilled user is thus the user whose will is generally constructive (in-sync) with the will of the group. This is true not only for the puck-within-a-puck method of conveying individual user input methods but also for alternate methods of conveying user intent vectors (including the tilt method, the swipe method, and the inverse method).

Targeting occurs when the outer puck 408 touches or envelopes one of the input choices 412. Once this occurs, the selected target is added to the answer 402 that is forming on the display 110. For example, if "B" was selected as a first letter in the answer 402, it would appear beside the phrase "ANSWER", as the first letter in an emerging word. If the next letter selected was "L", that target would appear next. The full answer 402 might appear as shown in FIG. 4: "BLUE". Thus, the answer 402 appears in real-time. Also, once the target is selected, the pointer 406 could be reset to a center of the display. The users then work together to select the next letter, number, or word.

Figure 6:
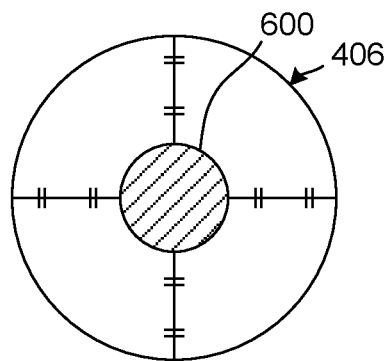
FIG. 6 is a diagram of a pointer in accordance with one embodiment of the present invention.
Figure 7:
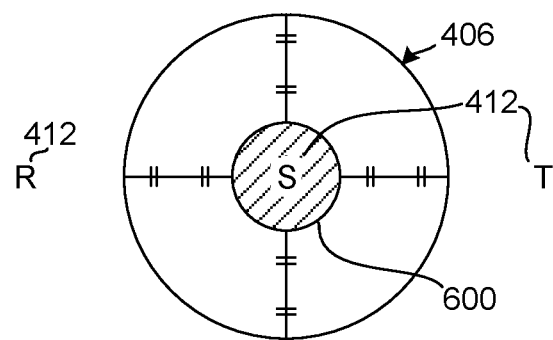
FIG. 7 is a diagram of the pointer in accordance with another embodiment of the present invention.

One embodiment of the graphical pointer 406 designed to visually highlight a central target area that must enclose the input choice 412 is shown in FIGS. 6 and 7. When using this pointer design, the target is selected when the pointer 406 is positioned by the group intent such that the input choice 412 is substantially within the central target area 600. For example, in FIG. 7, the letter "S" would be the target selected from among the available input choices 412.

In some embodiments, "BACKSPACE" and/or "DELETE" may be included as one of the input choices 412. For example, if it turns out that one or more of the already selected letters in the emerging answer 402 is not going to work coherently in the emerging word or sentence, the group would be hereby abled to target "BACKSPACE" (or "DELETE"), allowing the last target added to be deleted and then replaced by a new target. In addition, the system could require an icon or other representation for a "SPACE BAR" and/or basic punctuation, all of which may be selectable by the group to form words, sentences or even paragraphs collaboratively.

In some embodiments, users who earn points as described above, can "win" the right to ask the question 400 to the group (as it appears at the top of the display 110). For example, the user with the highest score for a given period of time could be the one who asks the next question. Or users could line up in a queue for asking questions, their entry into the queue and/or their placement in the queue, being based on their score for a period of time. This means, skilled users get to ask more questions to the group. This also gives users an incentive to perform "in-sync" with the group intent.

In some embodiments the group intent is based on the simple numerical average (vector sum) of the user intent vectors (direction and magnitude) collected from all the users. In other embodiments, the user who has earned a higher score (based on past performance), could be granted higher weighting by the CCS 142 when it computes the numerical average. Or, users who have spent more time on the system could be granted higher weighting by the CCS 142 when it computes the average. In this way, the CCS 142 could assign to each user a user weighting factor that weights the relative importance of that user's user intent vector as compared to the user intent vectors from the other users who are participating, when computing the resultant group intent vector. Embodiments that reward users with higher weighting factors based on higher scores and/or more participation time, gives incentive for users to function "in-sync" with the group, and to participate more often.

Hence, the contribution that each user has upon emergent group intent can be scaled using weighting factors such that some users have a greater impact than others based on their accuracy/value of their prior input and/or based on the amount of participation the user has had on the system. Each user will thus be associated with a variable called a user contribution index, which indicates the user's level of contribution to the overall group intent, this factor being used to scale the user's contribution to the weighted average.

In some embodiments, the CCS 142 may be configured to allow the group to collectively decide who asks the next question, or to collectively select the next question from a queue of pending questions. For example, the plurality of users could enter questions into their portable computing devices 100, all of which are routed to the CCS 142, which then routes the list or otherwise causes the list of pending questions to be displayed locally on the local device displays 110. The plurality of users can then control the pointer 406 (or use other methods disclosed herein) to collectively select which question to answer next. Once this question is selected, the question 400 is presented to the group, and the group collectively selects among the input choices 412 (e.g. letters, words, numbers, and/or punctuation) to form the answer 402.

In some embodiments, users selectively form the next question, by selecting letters, numbers, words, and punctuation from the input choices 412. In some embodiments, two collective collaboration servers 142 could be employed at once, each with a separate group of users. A first server can allow a first group of users to collectively ask a question of a second group of users of a second server. The second group of users of the second server can respond to the question posed by the first group of users of the first CCS server. This process could repeat, with questions and answers going back and forth between the first server and the second server, and vice versa.

Figure 8:
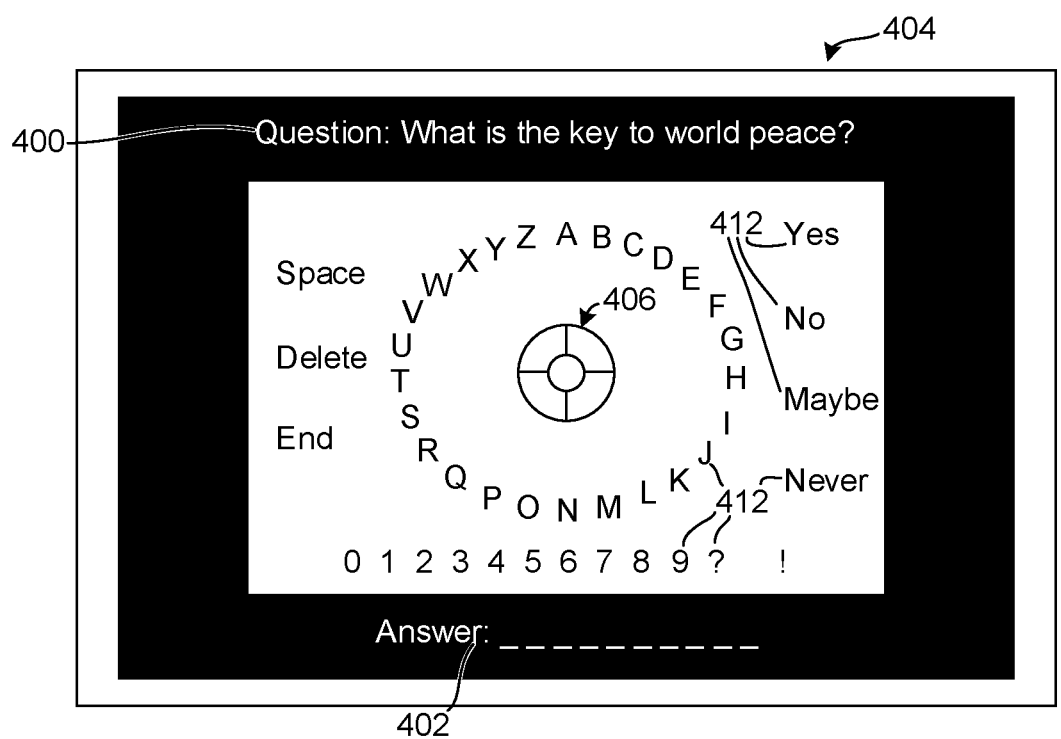
FIG. 8 is a target board in accordance with another embodiment of the present invention.

Referring next to FIG. 8, an embodiment of the target board 404 for use with the tilt and swipe input method is shown. Shown are the question 400, the group answer 402, the target board 404, the pointer 406, and the plurality of input choices 412.

One aspect of the "puck-within-a-puck" method described above is that the user concentrates on keeping the inner puck 410 within the outer puck 408, which takes mental focus. For versions that require less focus, the screen tilt input method may be employed as the user interface method. In such an embodiment, all users watch the pointer 406 on their display 110, its location updated based on the group intent. The group averaging methods can be the same as described above, but in this embodiment each user's user intent vector is based on the tilt of that user's portable computing device 100 (rather than on the relative location of that user's inner puck 410 with respect to the outer puck 408). The magnitude and direction of the tilt, conveys that user's user intent vector, which is sent to the CCS 142 and averaged into the group intent vector, which is used to update the location of the pointer 406. With respect to FIG. 8, the target board 404 shown on the display 110 is shown with the pointer 406 and the field of input choices 412. The user who looks at this display 110 on the portable computing device 100 and wants to make the pointer 406 go towards the letter "G" would tilt the device 100 rightward. The user who looks at the display 110 and wants to make the pointer 406 go towards the letter "T" would tilt the display 110 leftward. If the user wanted to target the letter "A" the user would tilt the device 100 upward, etc. But, the pointer 406 does not move based on the individual user's intent, but based on the group intent.

This means the user might be watching the pointer 406 head for the letter "L" at the bottom of the display 110, but he wants it to head for the letter "Z" on the top of the display 110, so that user tilts the device 100 upward, thus conveying the user intent vector in that direction (to be added to the group intent). Again, scoring can be based on how well the user's user input vector (now based on tilt), matches the average group input vector across the collective group. In lieu of the screen tilt input method, users on desktop computers or other devices 100 not compatible with the screen tilt input method could convey the user input vector with the mouse or other input device, rather than tilt.

When using the swipe input method, the user executes a swipe gesture by sliding his finger across the pointer 406 on his display 110 in a rapid slash motion. The swipe gesture conveys the user intent direction (direction of the swipe) and the user intent magnitude (speed of the swipe) that comprises the user intent vector (magnitude and direction). Data that represents the user intent vector is then sent from the portable computing device 100 of that user to the CCS 142 over the communication link. The same is true for the plurality of other users, who also issue swipe gestures to the pointer 406 displayed on their own portable computing device 100. As with the examples above, the location and motion of the pointer 406 on the display 110 of any single user's portable computing device 100 is not directly responsive to that user's swipes, but is responsive to the collective average of swipes across the plurality number of users, which are averaged into the group intent vector (as described above). This can be thought of as an average swipe vector across the plurality of users. The average swipe vector can be computed through a direct vector summation or through a weighted vector summation of the individual swipes executed by users during a period of time. In one example, the time period is 1 second. Thus, every second the CCS 142 computes the group intent vector (or average swipe vector) across all user intent vectors it received during that period from portable computing devices 100. Using that group intent vector (magnitude and direction), the CCS 142 updates the coordinate location of the pointer 406 and sends the updated coordinates to the portable computing devices 100. The users all see the updated location and issue more swipes, either trying to coax the pointer 406 in the direction the pointer 406 is already heading (constructive), or trying to coax the pointer 406 in a new direction (destructive) by repeatedly swiping at the pointer 406 with updated directions and magnitudes.

One of the many functions described above for the software running on the CCS 142, is to rapidly compute the group intent vector(GIV) based upon the plurality of user intent vectors (UIV) that have been received for the particular prior time period. In an example, the time period is 0.25 seconds and there are 100 users contributing. Thus, four times per second the CCS 142 receives 100 User Intent Vectors, each comprising a magnitude and direction. These 100 values are represented as $UIV_1$, $UIV_2$, $UIV_3$ ... $UIV_{100}$. Thus, in the simplest embodiment the group intent vector can be computed as $GIV=(UIV_1+UIV_2+UIV_3+\ldots UIV_{100})/100$. In more sophisticated embodiments, the weighted average can be used wherein each $UIV_n$ is scaled by a user weighting factor that adjusts the relative importance of that user's input to the resultant GIV. For each user's weighting factor $UWF_n$ the GIV is computed as follows:

$$GIV=(UIV_1\times UWF_1+UIV_2\times UWF_2+UI\times UW+\ldots UIV_{100}\times UWF_{100})/100$$

The location of the pointer 406 is then updated using the magnitude and direction components of the GIV for that period of time. This is repeated, time-step after time-step, making the pointer 406 move smoothly under the collective collaborative control of the 100 users, closing the loop around each of them, for they can see in real-time (or near real-time) the motion of the pointer 406 based on the group intent.

In some embodiments the magnitude of the user intent vector is computed not based on the velocity of the swipe executed by the user on the pointer 406, but based on the frequency of repeated swipes executed by the user during a polling interval. For example, the polling interval could be 2 seconds, therefore the user could be repeatedly issuing swipes to the pointer 406 during that period. The CIA on the local device 100 keeps a running summation of the swipes, determining the magnitude based on the plurality of swipes executed by that user during the polling period. The CIA software can be configured to compute a vector sum of the plurality of swipes executed by the user, the direction and magnitude of the vector sum being an additive result of the plurality of swipes. Thus, if the user executed many swipes during the polling period and if the many swipes were substantially in the same direction, thus adding to a high magnitude in that direction, the user intent vector, as derived from the swipe vector sum, will be of a high magnitude in the repeatedly swiped direction. This allows the user to aggressively and actively swipe at the pointer 406, again and again, as fast as they can, to increase the magnitude of the user's user input vector.

Figure 9:
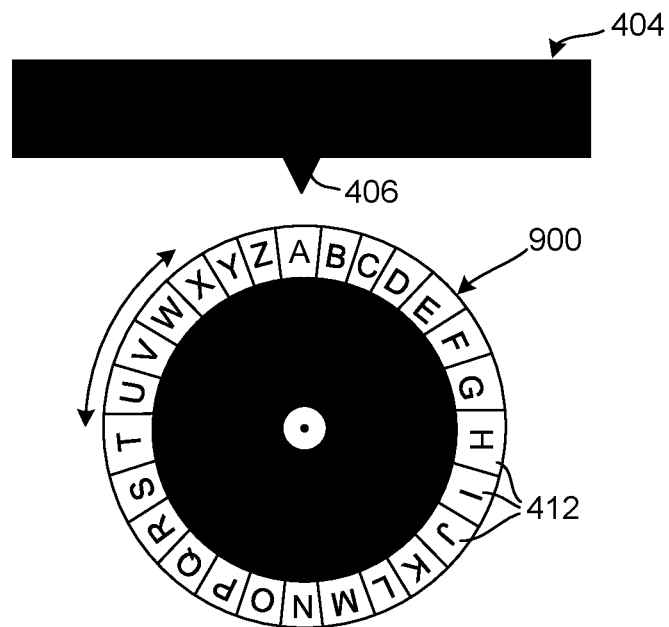
FIG. 9 is the target board in accordance with another embodiment of the present invention.

Referring next to FIG. 9, an embodiment of the display 110 using the inverse input method is shown. Shown are the question 400, the target board 404, the pointer 406, the plurality of input choices 412, and the input wheel 900.

In some embodiments, the inverse input control method can be employed where the pointer 406 remains fixed on the display 110 on the screen of each user's portable computing device 100, but the background field of input choices 412 is moved in response to the collective input of the group, such that the input choices 412 in the background field are targeted. One such method employs the input wheel 900 that is collectively rotated until a desired letter (or other input) is positioned so as to be targeted by the fixed pointer 406. There are a number of ways this can be configured.

In FIG. 9, the rotatable graphic input wheel 900 is displayed by the CIA app of the portable computing device 100 of the users, with the fixed pointer 406 displayed in a location relative to the input wheel 900. In a typical computer interface, the user might directly manipulate the input wheel 900, but not here. In this user interface 124, each user can swipe at the input wheel 900, imparting the user intent vector that indicates the direction and magnitude of wheel spin desired by that user so as to position the desired target input choice 412 under the pointer 406. The user intent vectors from the plurality of users is sent from their portable computing devices 100 to the CCS 142. The CCS 142 computes the summation of the user intent vectors (either the simple average or the weighted average or another algorithmic summation), and produces the group intent vector. This represents the collective will of the group at this moment in time, with respect to how the input wheel 900 should rotate (direction and magnitude of rotation for this time period). An updated orientation of the input wheel 900 is then sent from the CCS 142 to each of the plurality of portable computing devices 100, each of which updates the display 110 of the input wheel 900 for its user. The updated orientation may only change by a few degrees each cycle (or possibly less), so it looks like smooth rotations to the users, and not jumpy. Users could issue repeated rapid swipes to the wheel 900, conveying their intent based on repeated frequency, as described in the swipe input method above (the repeated swipes summed during repeated polling periods, as described above).

Targets may be selected for the emerging collective answer 402 when the collaborative motion of the input wheel 900 is such that the particular input choice 412 is positioned under the pointer 406 for more than a threshold amount of time, e.g. 3 seconds. Thus, if the wheel 900 rotates such that the letter "S" is positioned below the pointer 406 indicator, and remains substantially below the pointer 406 indicator for more than the threshold period of 3 seconds, that letter is selected, and added to the emerging text answer 402 that appears letter-by-letter on the display 110. In some embodiments, multiple input wheel/pointer pairs could be displayed at once on the display 110, allowing the users to collectively select a sequence of letters that are all visually displayed at once, as shown in FIG. 10.

Figure 10:
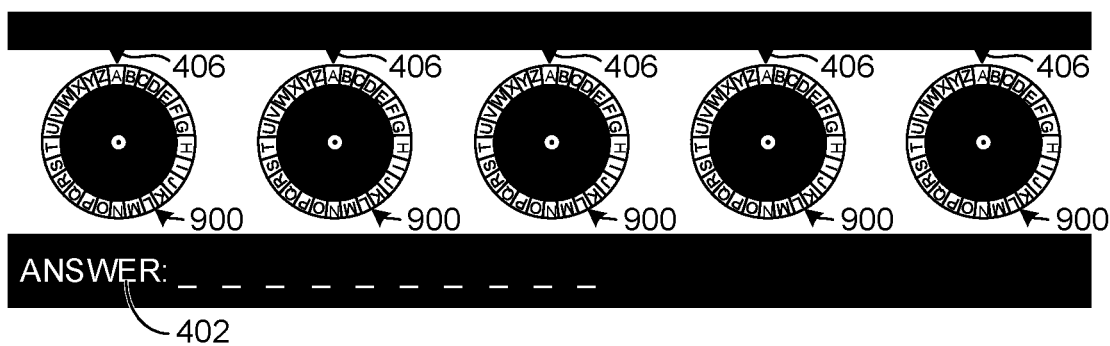
FIG. 10 is the target board in accordance with yet another embodiment of the present invention.

In some configurations of FIG. 10, the users could be restricted to manipulating the input wheels 900 collectively in a sequential order, left to right, causing the answer 402 to form. In other configurations the users could collectively control the plurality of input wheels 900 at the same time, thus causing the answer 402 to form, not letter by letter, but in a more organic manner. Any number of input wheels 900 could be used, and they could include not just letters but numbers, words, punctuation, delete and space, and other icons. In some embodiments the input wheels 900 could be displayed graphically as a cylindrical drum. In other embodiments the input wheels 900 could be replaced by flat sheets (fields) with input choices 412 upon them, the whole flat sheets being collectively moved planarly (in the plane) with respect to the fixed pointer 406. The fixed pointer 406 as shown in FIGS. 9 and 10 is shown as an arrowhead, but the pointer 406 could be a magnifier or a crosshair or other graphical indicator.

In some embodiments the CCS 142 may be configured not just to stream answers to the participants who are engaged in the session, for display to them, but also once the answer 402 appears as a fully formed response the CCS 142 could use Twitter to tweet the answer 402. Alternately the CCS 142 may be configured to convey the message using other forms of social media. This creates an expressive collaborative intelligence that issues its own tweets, expressing itself as an artificially produced consciousness to the world. This collective consciousness can be given a name in some embodiments, for example the name "UNUM" which means "The One" in Latin. This means, a feature of the CCS 142 software is enabled such that that once the answer 402 is complete, or once the answer 402 reaches a certain length (e.g. 140 characters), the answer 402 gets tweeted from @UNUM. Similarly, the answer 402 may be selectively posted by the CCS 142 on a dedicated website or Facebook page or other social media outlet. In addition, statistics about the answer 402 may be selectively posted along with the answer 402, including the number of participants who contributed to the answer 402.

In another embodiment, followers of UNUM on Twitter may be configured as the ones who ask questions to the collective consciousness, and then get the answer 402 through a resulting tweet. This can be enabled by linking the Twitter feed to the CCS 142 or to the CIA, routing incoming questions from Twitter into the CCS 142, and then routing resulting answers 402 from the CCS 142 to Twitter as tweets. In some embodiments, synthesized voice output may be used to read aloud the emergent answer 402 to each given question.

In addition to passing data that represents the changes in location between the pointer 406 and the targets, as a result of group input from the plurality of users, the CCS 142 and the CIA can be configured to pass data about and/or present data about the collaborative process that generated a particular answer. For example, during the session, while users are participating in the collaborative answer forming process, the CCS 142 can be configured to send data to the CIAs of the individual users, indicating the current number of participating users who are contributing to the response at that time. This number can be displayed upon the display 110 of individual portable computing devices 100 by the CIA. In addition, the CCS 142 can compute a convergence index that indicates how well the group is currently working towards a common goal, the group input being additively constructive or destructive. The convergence index can be computed as an absolute value of the group intent vector, for if the current group intent vector has a high absolute value (magnitude), then the group of users must be contributing in a constructive additive manner. But, if the current group intent vector value has a low absolute value (magnitude), then the group of users must be canceling each other out, their user intent vectors being in substantially different directions. This value is computed by the CCS 142 and passed to the CIA on individual devices 100. It can then be displayed in real-time to the users of the individual devices 100 while they participate. The convergence index can be configured to be represented as a value from 0 to 100 (thus a percentage) wherein 0 would indicate that the group of users are in a stalemate, or near stalemate, their user intent vectors combining to a 0 magnitude and the pointer 406 is stationary. Conversely a 100 value for the convergence index would indicate that the users are all urging the pointer 406 in the same direction, the pointer 406 moving at maximum speed. In some embodiments the convergence index is graphed, showing users how the convergence index is changing over time during the course of the question answering session. In other embodiments, the elapsed time over which the answer 402 was formed, from the time the question was posed until the answer 402 was complete, is tracked by the CCS 142 and presented to the users (via the CIA) upon completion of the answer 402. In some embodiments, scores are computed for users based on how "in-sync" they were with the emerging collaborative response (as described previously). In such embodiments, the CCS 142 can determine the high scorer and/or high scorers for a given session, or a number of sessions, and post a list of high scorers so the users know which user (by username) was the most effective contributor to the emergent answer, or answers 402. This allows users to engage in a competitive spirit that drives users to be constructive, not destructive, to the emerging collective will.

In some embodiments, a maximum speed of pointer motion is limited, for if the speed is too high it's too difficult for users to contribute effectively.

In some embodiments, pointer motion is given simulated inertia, such that once the pointer 406 is moving in a particular direction, it has momentum in that direction (using a mass simulation equation), and thus will continue to drift in that direction, slowing based on a simulated friction coefficient.

In some embodiments, a coherence support algorithm is employed by the CCS 142 that bars users from collectively selecting sequential letters that do not form a word in the language being employed. For English, for example, a spell checker engine is used to determine what letters are valid "next letters" in the emerging answer 402 and only allow the users to choose from those letters as they select the next element in the answer 402. In such embodiments, the available letters could be highlighted (or the unavailable letters could be dimmed or could disappear from the target display) as the users try to select the appropriate next letter. Thus, for example, if a word is forming collectively and it so far spells "THEI", there are a limited number of letters that can follow that sequence and form a valid word. The letter "Q", for example is NOT part of any valid word in the English language, following that sequence, and thus it can be BARRED from selection by the users by the CCS 142, or by a local routine on the CIA. In the server-controlled embodiment, the CCS 142 can send regular updates of barred letters as the answer 402 is forming. The coherence support algorithms are critical for ensuring that responses are NOT gibberish, but real words. As sentences form collectively, a grammar support algorithm could be employed to ensure that words chosen in sequence (separated by spaces) are only allowed that make grammatical sense.

For embodiments where there is only one possible letter that can complete the valid word, the CCS 142 can auto-complete the word, thus making the word formation process faster and more efficient. The users could still collectively input BACKSPACE, if they wish to erase the autocomplete.

In some embodiments, when the valid word has been produced collectively by the group such that no additional letter could be added to it and have it remain valid, the CCS 142 can automatically select SPACEBAR and thus speed the formation of a sentence.

In some embodiments, each user's user intent vector can be imparted into the portable computing device 100 using a camera or other eye-tracking means, the user intent vector being based on the gaze location of the user in part or in combination with tilt, finger location, and/or swipes. For example, the user's gaze might be aimed at the edge of the pointer 406 that corresponds with the direction the user wants the pointer 406 to go. The angle from the center of the pointer 406 to the edge of the pointer 406 where the user's gaze is aimed, can be used to compute the user intent vector. Or, the user's gaze could be aimed at the actual target location, and the angle from the center of the pointer 406 to the location where the user's gaze is aimed can be used to compute the user intent vector. The user intent vector is then communicated to the CCS 142 by the CIA, as described previously.

For some embodiments, especially embodiments that support large numbers of users, multiple pointers 406 are employed simultaneously on the target board 404, enabling users to collectively move said multiple pointers 406 in parallel. This works well with swipe embodiments, where the user can selectively swipe at more than one of the pointers 406 (not at the same time) to convey his or her intent on how each of the multiple pointers 406 should move. In such an embodiment the CIA from the individual user's portable computing devices 100 reports multiple user intent vectors to the CCS 142, one user intent vector for each pointer 406 the user conveyed intent with respect to. Thus, if there were three pointers 406 on the display 110, and the user swiped sequentially at all three, conveying his or her intent for how each of the three pointers 406 should move, the CIA app would report three user intent vectors (UIVA, UIVB, UIVC) to the CCS 142. The CCS 142 would compute the group intent vector for each of the three pointers 406 that are being controlled collectively by the plurality of users, and report updated coordinate locations back to the portable computing devices 100 for each of the three pointers 406 being controlled collectively by the plurality of users. In this way, multiple pointers 406 can be collectively controlled by the plurality of users in parallel. In some embodiments, each of the multiple pointers 406 is given a different visual label on the display 110 or other unique identifier or unique shape, so it can be distinguished from the other of the pointers 406. In some such embodiments, each of the multiple pointers 406 is assigned a unique function with respect to the other pointers 406. For example, a first pointer can be assigned a task of selecting the next element in the emerging answer 402, a second pointer can be assigned a task of selecting the element after the next element in the emerging answer 402, and a third pointer can be assigned a task of selecting the element after the element after the next element of the emerging answer 402. And, when the first pointer selects the target element, the roles shift, with the second pointer now assigned the task of selecting the next element, the third pointer now assigned the task of selecting the element after the next element, and the first pointer is now assigned the task of selecting the element after the element after the next element in the emerging answer 402. This can be thought of as a rotating queue where a pointer gets to the back of the line after it successfully selects one element in the emerging answer 402. In this way, multiple pointers 406 can move about the display 110 in parallel, heading towards the next element, an element after the next, an element after that, (and optionally more next elements), all controlled collectively by the users. This allows answers to emerge faster. (Typing is analogous to this technique. An individual typing will aim for a key to hit, while also positioning his finger over the next key to hit. Without doing these actions in parallel, typing is slow. The control of pointers 406, in parallel, collectively, is thus a highly innovative method for allowing the group of users to act the way a single human brain does, thinking ahead and getting ready for a next action to come).

Figure 11:
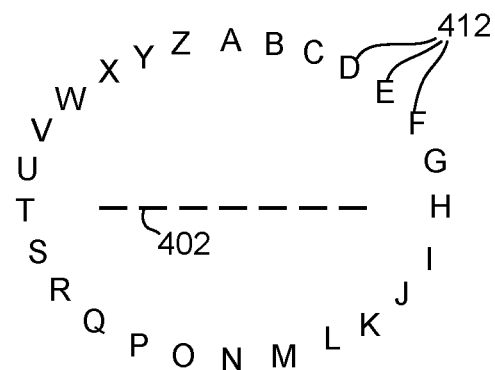
FIG. 11 is the target board in accordance with yet another embodiment of the present invention.
Figure 12:
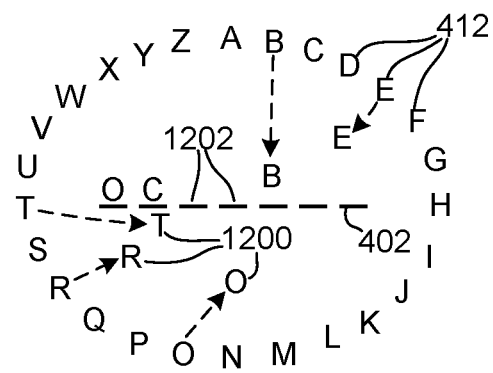
FIG. 12 is the target board in accordance with yet another embodiment of the present invention.

Referring next to FIGS. 11 and 12, the target board 404 in an additional embodiment of the inverse target method is shown. Shown are the answer 402, the plurality of input choices 412, a plurality of input choice copies 1200, and underscore elements 1202.

Using the embodiments above that enable the group of users to collectively control multiple moving objects on the display 110 in real-time, the inverse input method can also be employed where there are no pointers to aim at input choices 412 but instead, the input choices 412 themselves are moved about the display 110, chosen from the field of input choices 412. As shown in FIG. 11, the field of input choices 412 can be displayed for the users. In this case the input choices 412 are letters, but the input choices 412 may also include numbers and punctuation, as well as SPACE-BAR and DELETE functions. The input choices 412 may also include words, as described previously. In this embodiment, users can swipe at one or more input choices 412, and a copy of that input choice 412, the input choice copy 1200, will start to move. Collectively, the users are instructed to arrange the input choices 412 in order, so as to form the word or words that answer the question posed (or otherwise convey the collective intent of the group). In this way, multiple input choices 412 can be moved at once, all converging on the answer area (which is shown as underscores in FIGS. 11 and 12). As the users swipe at the input choice copies, conveying user intent vectors, the input choice copies move based on the group intent, some input choice copies moving faster than others. The input choice copy 1200 may head to a first underscore element 1202 of the answer 402, and other input choice copies 1200 may head towards other underscore elements 1202 of the answer 402. The result is the word forming in parallel, the letters seeming to arrange themselves. When spacebar and punctuation is allowed, entire sentences can form in parallel this way. The lexical coherence support methods described previously can also be employed, blocking some letters from filling some underscore elements 1202 based on the already filled letters in underscore elements 1202, disallowing arrangements that don't form coherent words. A DELETE input choice can also be moved about the display 110, to delete a target that has been positioned into the underscore element 1202. This allows collective flexibility in the emerging answer 402.

Referring again to FIG. 12, the target board 404 appears on the display 110 of the portable computing devices 100 of each of the plurality of users as implemented by the CIA running on each of those devices 100. The users of each device 100 can selectively swipe at any of the letters (input choices 412), thereby generating the user intent vector with respect to that input choice 412. For example, if the user swipes at a letter F, that user will generate the user intent vector for the letter F input choice, $UIV_F$, that will get sent to the CCS 142. The CCS 142 will collect all the user intent vectors with respect to the letter F and create the group intent vector with respect to the letter F. The CCS 142 will then determine if the letter F will start moving based on the group intent vector. If so, the input choice copy 1200 of the letter F will start to move away from the stationary input choice F. This is done by the CCS 142 sending coordinates to the multiple devices 100 indicating the updated location of the letter F input choice copy 1200 based on the group intent vector. Other users may see this moving input choice copy 1200 F and swipe to move the letter F input choice copy 1200 back towards the stationary letter F input choice location, or may swipe to aiming the letter F input choice copy 1200 towards one underscore element 1202 in the answer 402. Alternately, based on the user intent vectors the group may be in a stalemate and the letter F input choice copy 1200 will not move. Of course, while this is happening, other users are swiping at other letter input choice copies 1200, moving them in the same way, through interactions with the CCS 142. Thus, many letters are moving towards underscore elements 1202 in parallel, with many users reacting and responding, by swiping at the letter input choice copies 1200, either constructively or destructively, depending on their intent. The collective group intent will be represented as a motion of letter input choice copies 1200 on the display 110, the letter input choice copies 1200 finding their place in the awaiting underscore elements 1202 until the answer 402 forms. An intermediate state of this process can be seen with respect to FIG. 12. As shown in FIG. 12, the answer is forming, possibly the word "OCTOBER", through the real-time collective group intent of the large number of users, all swiping at letter input choices 412 and collectively moving them.

In such embodiments, once the input choice copy 1200 substantially nears the awaiting underscore element 1202, it is deemed targeted by the CCS 142 and highlighted in the underscore element 1202. The target can then become fixed in place, such that the target is no longer movable by the users. In some embodiments, the DELETE icon can be movable on the display 110 as well, and if moved to a selected target in the underscore element 1202, remove that target. The DELETE icon can be a red circle with a slash through it. Also, a SPACE icon can be collectively selected and positioned, making spaces between words in an emerging sentence.

It will be appreciated that the unique collaborative system disclosed herein, enabling users to convey user intent vectors that are summed or otherwise amalgamated in substantial real-time into the group intent vector, can be employed through software to enable other innovative collaborative systems, services, and functions. For example, if the collaboratively controlled pointer 406 is configured to leave a trail of pixels, a group of users is thereby enabled to collaboratively draw a picture, creating artwork which is produced not by any individual user but by the emergent collaborative consciousness. This would be artwork from a collective artificial intelligence. Such an embodiment could allow the users to collaboratively select from among a range of colors for the trail of pixels, collaboratively select among a "brush size" for the trail of pixels, and collaboratively select when the brush is leaving the trail and when it is not leaving the trail, thus allowing for empty space. In another embodiment, the users could collaboratively select and move a plurality of graphical elements around the display 110, arranging them into desired or prescribed configurations through the collaborative real-time closed-loop swiping process described with respect to letters above. As with the letters, the plurality of graphical elements could be in motion at once, allowing for a parallel emergent display. In such embodiments, the scoring and weighting functions described previously can be employed.

While many embodiments are described herein, it is appreciated that this invention can have a range of variations that practice the same basic methods and achieve the novel collaborative capabilities that have been disclosed above. Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While the invention herein disclosed has been described by means of specific embodiments, examples and applications thereof, numerous modifications and variations could be made thereto by those skilled in the art without departing from the scope of the invention set forth in the claims.

What is claimed is:

1. A real-time collaborative intelligence system comprising:
   a plurality of computing devices each comprising a communications infrastructure coupled to each of a processor, a memory, a timing circuit, and a user interface coupled to a display and configured to receive input from a user;
   a collaborative intent application stored on each memory and configured to run on each processor, to:
      display a question and a set of spatially arranged answer options for a collaborative intelligence session, a collaboratively controlled graphical pointer having a movable location in relation to the set of spatially arranged answer options,
      receive, repeatedly in real-time during the session, a user intent through the user interface, the user intent having a direction value in relation to the set of spatially arranged answer options,
      send, repeatedly in real-time during the session, an updated user intent to a collaboration server,
      receive, repeatedly in real-time during the session, a coordinate location in relation to the set of spatially arranged answer options, and
      update, repeatedly in real-time during the session, the location of the collaboratively controlled graphical pointer in relation to the set of spatially arranged answer options using the received coordinate location; and
   the collaboration server in networked communication with the plurality of computing devices, the collaboration server including a processor and a memory, the processor configured to run a collaboration mediation application stored on the memory, the collaboration mediation application configured to:
      send the question and the set of spatially arranged answer options for the collaborative intelligence session to each of the plurality of computing devices,
      receive, repeatedly in real-time during the session, the user intent from each of the plurality of computing devices, responsively determine, repeatedly in real-time during the session, a group intent from the plurality of received user intents, responsively determine, repeatedly in real-time during the session, an updated coordinate location for the collaboratively controlled graphical pointer based at least in part upon the group intent, and send, repeatedly in real-time during the session, the coordinate location to the plurality of computing devices;

whereby the coordinate location is updated repeatedly by the collaboration server, whereby a closed-loop system is formed between the collaboration server and each collaborative intent application.

2. The real-time collaborative intelligence system of claim 1, wherein determining the group intent is computed using a weighted average of user intents, wherein the weighting for at least one user intent is based at least in part upon a user score associated with the user generating the at least one user intent.

3. The real-time collaborative intelligence system of claim 2 wherein the user score associated with the user is based on that user's performance in at least one prior collaborative intelligence session.

4. The real-time collaborative intelligence system of claim 2 wherein the user score associated with the user is based on that user's accuracy in at least one prior collaborative intelligence session.

5. The real-time collaborative intelligence system of claim 1, wherein the question asks which team will win a sporting event, and the set of answer options includes the names of a plurality of sports teams.

6. The real-time collaborative intelligence system of claim 1, wherein the collaborative intent application is further configured to display a graphical indication of the user intent on the display.

7. The real-time collaborative intelligence system of claim 6, wherein the graphical indication of the user intent is an updated location of a user controlled graphical pointer, separate from the collaboratively controlled graphical pointer, on the display.

8. The real-time collaborative intelligence system of claim 7, wherein the direction of the user intent is derived at least in part based on relative locations of the user controlled graphical pointer and the collaboratively controlled graphical pointer.

9. The real-time collaborative intelligence system of claim 1, each of the plurality of computing devices further including a tilt sensor coupled to the processor, wherein the user interface is updated using the tilt sensor, and the collaborative intent application is further configured to receive a user input using the tilt sensor and compute the user intent based at least in part upon the tilt value.

10. The real-time collaborative control system of claim 1, wherein the user input is received using a touchscreen display.

11. The real-time collaborative intelligence system of claim 10, wherein the user intent is derived based upon a swipe gesture imparted by a user upon the touch screen, the direction of the user intent based upon a direction of the swipe gesture.

12. The real-time collaborative intelligence system of claim 11, wherein the user intent has a magnitude and the magnitude of the user intent is derived at least in part based upon a velocity of the swipe gesture imparted by the user upon the touchscreen.

13. The real-time collaborative intelligence system of claim 1, wherein the collaboration server is further configured to:

determine when an answer option is selected from the set of spatially arranged answer options based at least in part upon a proximity between the location of the collaboratively controlled graphical pointer and a spatial location of the selected answer option; and send, upon determining that the answer option is selected, an indication of the selected answer option to the plurality of computing devices.

14. The real-time collaborative intelligence system of claim 13, wherein the determining that the answer option is selected is based at least in part upon whether the collaboratively controlled graphical pointer is within a proximity of the selected answer option for more than a threshold amount of time.

15. The real-time collaborative intelligence system of claim 8, wherein the user intent has a magnitude based at least in part on a distance between the real-time location of the user controlled graphical pointer on the display and the real-time location of the collaboratively controlled graphical pointer on the display.

16. A method for a collaborative intelligence process in real-time, comprising the steps of:

sending of information for a group intelligence session, the information including a question and a set of spatially arranged answer options, and a collaboratively controlled graphical pointer having a location in relation to the set of spatially arranged answer options, from a collaboration server running a collaboration mediation application, to each of a plurality of computing devices, each of the computing devices including a display and running a collaborative intent application, wherein steps are performed substantially simultaneously on each of the plurality of computing devices;

inputting, repeatedly in real-time, by a user of each of the plurality of computing devices, an indication of a user intent in response to the group intelligence session information, the user intent having a direction in relation to the set of spatially arranged answer options and a magnitude;

sending, repeatedly in real-time, to the collaboration server, by each collaborative intent application, of the user intent;

determining, repeatedly in real-time, by the collaboration server, of a group intent based on the plurality of received user intents;

determining, repeatedly in real-time, an updated coordinate location associated with the collaboratively controlled graphical pointer based at least in part upon the group intent, and sending, repeatedly in real-time, by the collaboration server, of a coordinate location to the collaborative intent application of each of the plurality of computing devices, and updating, repeatedly in real-time, by the collaborative intent application, the location of the collaboratively controlled graphical pointer using the received coordinate location, whereby the coordinate location is updated repeatedly by the collaboration server, whereby a closed-loop system is formed between the collaboration server and each collaborative intent application running on the plurality of computing devices.

17. The real-time collaborative intelligence process of claim 16, wherein determining the group intent is computed as a weighted average of user intents, wherein the weighting used for at least one user intent is based at least in part upon a user score associated with the user generating the at least one user intent.

18. The real-time collaborative intelligence process of claim 17 wherein the user score associated with the user is based on that user's performance in at least one prior collaborative intelligence session.

19. The real-time collaborative intelligence process of claim 17 wherein the user score associated with the user is based on that user's accuracy in at least one prior collaborative intelligence session.

20. The real-time collaborative intelligence system of claim 17, wherein the question asks which team will win a sporting event, and the set of answer options includes the names of a plurality of sports teams.

21. The real-time collaborative intelligence system of claim 16, wherein determining the updated coordinate location of the collaboratively controlled graphical pointer is based at least in part upon a mass value associated with the graphical pointer in a physics model.

22. The method for the collaborative intelligence process in real-time of claim 16, wherein the collaborative intent application is further configured to display a graphical indication of the user intent on the display.

23. The method for the collaborative intelligence process in real-time of claim 22, wherein the graphical indication of the user intent is an updated location of a user controlled graphical pointer on the display.

24. The method for the collaborative intelligence process in real-time of claim 23, wherein the direction of the user intent is derived at least in part based on relative locations of the user controlled graphical pointer and the collaboratively controlled graphical pointer.

25. The method for the collaborative intelligence process in real-time of claim 23, wherein the direction of the user intent is derived at least in part based on an angle between a gaze of the user and the location of the collaboratively controller pointer.

26. The method for the collaborative intelligence process in real-time of claim 16, further comprising the step of determining by the collaboration server that an answer option from the set of answer options has been selected.

27. The method for the collaborative intelligence process in real-time of claim 26, further comprising the steps of:
   determining when an answer option is selected from the set of spatially arranged answer options based at least in part upon a proximity between the location of the collaboratively controlled graphical pointer and the spatial location of the selected answer option; and
   sending, upon determining that the answer option is selected, an indication of the selected answer option to the plurality of computing devices.

28. The real-time collaborative intelligence process of claim 16, wherein the user input is received using a touchscreen display.

29. The real-time collaborative intelligence process of claim 28, wherein the user intent is derived based upon a swipe gesture imparted by a user upon the touchscreen, the direction of the user intent based upon a direction of the swipe gesture.

30. The real-time collaborative intelligence process of claim 29, wherein the user intent has a magnitude and the magnitude of the user intent is derived at least in part based upon a velocity of the swipe gesture imparted by the user upon the touchscreen.

31. A method for determining a real-time group response from a plurality of networked computing devices during a collaborative intelligence session, each computing device including a display and associated with a user, wherein steps are performed substantially simultaneously on each of the plurality of computing devices, comprising the steps of:
   sending across a network, by a collaboration server, of information for the collaborative intelligence session, the information being used to display of a set of targets, a collaboratively controlled graphical pointer having a location in relation to the set of targets, and a question associated with the set of targets, to the plurality of computing devices;
   displaying, by a collaborative intent application running on each of the plurality of computing devices, of the question, the set of targets, and the collaboratively controlled graphical pointer having the location in relation to the set of targets;
   inputting, repeatedly in real-time during the session, by each user, of a user intent representing a desired direction and magnitude of motion of the collaboratively controlled graphical pointer;
   sending, repeatedly in real-time during the session, by the collaborative intent application running on each computing device, of the user intents to the collaboration server in communication with the plurality of computing devices;
   determining, repeatedly in real-time during the session, by the collaboration server of a group intent from the plurality of received user intents and weighting values associated with each of the plurality of user intents;
   determining, repeatedly in real-time during the session, an updated coordinate location for the collaboratively controlled graphical pointer based at least in part upon the group intent;
   sending, repeatedly in real-time during the session, by the collaboration server to the plurality of computing devices of the updated coordinate location for the collaboratively controlled graphical pointer; and
   updating, repeatedly in real-time during the session, by the collaborative intent application of each computing device, of a displayed location of the collaboratively controlled graphical pointer with respect to the set of targets based upon the received updated coordinate location, whereby the real-time group response to the question is determined.

32. The method for determining the real-time group response of claim 31 wherein the weighting values associated with each user intent are based at least in part upon that user's performance in at least one prior collaborative intelligence session.

33. The method for determining the real-time group response of claim 31 wherein the weighting values associated with each user intent are based at least in part upon that user's accuracy in at least one prior collaborative intelligence session.

* * * * *

UNITED STATES PATENT AND TRADEMARK OFFICE
CERTIFICATE OF CORRECTION

PATENT NO. : 10,599,315 B2
APPLICATION NO. : 15/936324
DATED : March 24, 2020
INVENTOR(S) : Rosenberg Page 1 of 1

It is certified that error appears in the above-identified patent and that said Letters Patent is hereby corrected as shown below:

In the Claims
Claim 10, Column 27, Line 55, delete "control" and insert --intelligence--.
Claim 20, Column 29, Line 15, delete "system" and insert --process--.
Claim 21, Column 29, Line 19, delete "system" and insert --process--.

Signed and Sealed this
Seventh Day of July, 2020

Andrei Iancu
*Director of the United States Patent and Trademark Office*